(12) United States Patent
Wang et al.

(10) Patent No.: US 11,710,242 B2
(45) Date of Patent: *Jul. 25, 2023

(54) METHODS AND SYSTEMS FOR IMAGE SEGMENTATION

(71) Applicant: SHANGHAI UNITED IMAGING HEALTHCARE CO., LTD., Shanghai (CN)

(72) Inventors: Xiaodong Wang, Shanghai (CN); Yufei Mao, Shanghai (CN); Renchao Jin, Wuhan (CN); Yujie Tian, Wuhan (CN); Naiwen Hu, Wuhan (CN); Lijun Xu, Wuhan (CN); Fengli He, Wuhan (CN); Hong Liu, Wuhan (CN); Kai He, Wuhan (CN); Enmin Song, Wuhan (CN); Xiangyang Xu, Wuhan (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 237 days.

This patent is subject to a terminal disclaimer.

(21) Appl. No.: 17/169,480

(22) Filed: Feb. 7, 2021

(65) Prior Publication Data
US 2021/0183071 A1    Jun. 17, 2021

Related U.S. Application Data

(63) Continuation of application No. 16/236,954, filed on Dec. 31, 2018, now Pat. No. 10,949,977, which is a
(Continued)

(51) Int. Cl.
*G06T 7/00*   (2017.01)
*G06T 7/187*  (2017.01)
(Continued)

(52) U.S. Cl.
CPC .............. *G06T 7/187* (2017.01); *G06F 17/16* (2013.01); *G06F 18/24* (2023.01); *G06T 7/0012* (2013.01);
(Continued)

(58) Field of Classification Search
CPC ......... G06T 7/187; G06T 7/0012; G06T 7/11; G06T 7/12; G06T 7/136;
(Continued)

(56) References Cited

U.S. PATENT DOCUMENTS 7,809,174 B2 * 10/2010 Ferrant ................... G06T 7/12
                                                       382/128
8,761,473 B2    6/2014 Ihara
(Continued)

FOREIGN PATENT DOCUMENTS

CN    102254097 A    11/2011
CN    103310449 A    9/2013
(Continued)

OTHER PUBLICATIONS

International Search Report in PCT/CN2017/091329 dated Mar. 27, 2018, 7 pages.
(Continued)

*Primary Examiner* — Ping Y Hsieh
(74) *Attorney, Agent, or Firm* — Metis IP LLC

(57) ABSTRACT

The application discloses a method and system for segmenting a lung image. The method may include obtaining a target image relating to a lung region. The target image may include a plurality of image slices. The method may also include segmenting the lung region from the target image, identifying an airway structure relating to the lung region, and identifying one or more fissures in the lung region. The method may further include determining one or more pulmonary lobes in the lung region.

20 Claims, 25 Drawing Sheets

Related U.S. Application Data continuation of application No. PCT/CN2017/091329, filed on Jun. 30, 2017.

(51) Int. Cl.

| | | |
|---|---|---|
| *G06T 7/11* | (2017.01) | |
| *G06F 17/16* | (2006.01) | |
| *G06T 7/136* | (2017.01) | |
| *G06T 7/12* | (2017.01) | |
| *G06F 18/24* | (2023.01) | |

(52) U.S. Cl.
CPC .............. *G06T 7/11* (2017.01); *G06T 7/12* (2017.01); *G06T 7/136* (2017.01); *G06T 2207/10081* (2013.01); *G06T 2207/20072* (2013.01); *G06T 2207/20156* (2013.01); *G06T 2207/30061* (2013.01); *G06T 2207/30172* (2013.01)

(58) Field of Classification Search
CPC . G06T 2207/10081; G06T 2207/20072; G06T 2207/20156; G06T 2207/30061; G06T 2207/30172; G06T 7/149; G06T 7/181; G06T 2207/10088; G06T 2207/10104; G06T 2207/20116; G06T 2207/20161; G06T 7/155; G06T 2207/10072; G06T 2207/10132; G06T 2207/20152; G06F 17/16; G06K 9/6267
See application file for complete search history.

(56) References Cited

U.S. PATENT DOCUMENTS

| | | | | |
|---|---|---|---|---|
| 2005/0196024 | A1* | 9/2005 | Kuhnigk | G06V 10/26 382/128 |
| 2006/0239522 | A1* | 10/2006 | Ferrant | G06T 7/155 382/128 |
| 2007/0133894 | A1* | 6/2007 | Kiraly | G06V 10/443 382/128 |
| 2009/0092300 | A1 | 4/2009 | Jerebko et al. | |
| 2009/0185731 | A1* | 7/2009 | Ray | G06T 7/12 382/131 |
| 2014/0105472 | A1* | 4/2014 | Yin | G06T 7/0012 382/128 |
| 2016/0189373 | A1* | 6/2016 | Park | G06T 7/155 382/131 |
| 2016/0328850 | A1* | 11/2016 | Yin | A61B 6/032 |
| 2017/0224301 | A1* | 8/2017 | Radhakrishnan | A61B 6/50 |
| 2018/0047168 | A1* | 2/2018 | Chen | G06T 7/11 |

FOREIGN PATENT DOCUMENTS

| | | |
|---|---|---|
| CN | 104268893 A | 1/2015 |
| CN | 104504737 A | 4/2015 |
| CN | 105488796 A | 4/2016 |

OTHER PUBLICATIONS

Extended European Search Report in European Application No. 17915961.1 dated May 4, 2020, 11 pages.
Doel, T. et al., Review of automatic pulmonary lobe segmentation methods from CT, Computerized Medical Imaging and Graphics, 2015, 17 pages.
Geng, Huan et al., Survey of Lung Tissues Segmentation Based on CT Image, Application Research of Computers, 2016, 7 pages.
Lassen, B. et al., Automatic Segmentation of the Pulmonary Lobes From Chest CT Scans Based on Fissures, Vessels, and Bronchi, IEEE Transactions on Medical Imaging, 2013, 13 pages.
Liu, Junwei, Research of Level Set Method for Image Segmentation and its Applications in Medical Images, Hefei University of Science and Technology of China, 2009, 109 pages.
Pan, Yan, Automatic Segmentation of Lung Lobes Based on CT Images, Nanjing: Southeast University, 2004, 61 pages.
Park, S. J. et al., Automatic lobar segmentation for diseased lungs using an anatomy based priority knowledge in low-dose CT images, Conference on Medical Imaging—Image Processing, 2014, 7 pages.
Rikxoort, E. M. V. et al., Automatic Segmentation of the Pulmonary Lobes from Fissures, Airways, and Lung Borders: Evaluation of Robustness against Missing Data, International Conference on Financial Cryptography and data security, 2009, 9 pages.
Rikxoort, E. M. V. et al., Automatic Segmentation of Pulmonary Segments From Volumetric Chest CT Scans, IEEE Transaction on Medical Imaging, 2009, 10 pages.
Ross, J. C. et al., Automatic Lung Lobe Segmentation Using Particles, Thin Plate Splines, and Maximum a Posteriori Estimation, 2010, 9 pages.
Ukil, S. et al., Anatomy-Guided Lung Lobe Segmentation in X-Ray CT Images, 2009, 40 pages.
Weng, Xin, Research on Automatic Segmentation of Lung Lobes Based on CT Images, Shenyang: Northeastern University, 2012, 72 pages.
Xiao, Rvning et al., Automatic Segmentation of Pulmonary Fissure in CT Image Based on a Shortest-path Algorithm, Computer and Information Technology, 2015, 4 pages.
Yu, Mali et al., Automatic Segmentation of Pulmonary Fissures in Computed Tomography Images Using 3D Surface Features, Journal of Digital Imaging, 2013, 10 pages.

\* cited by examiner

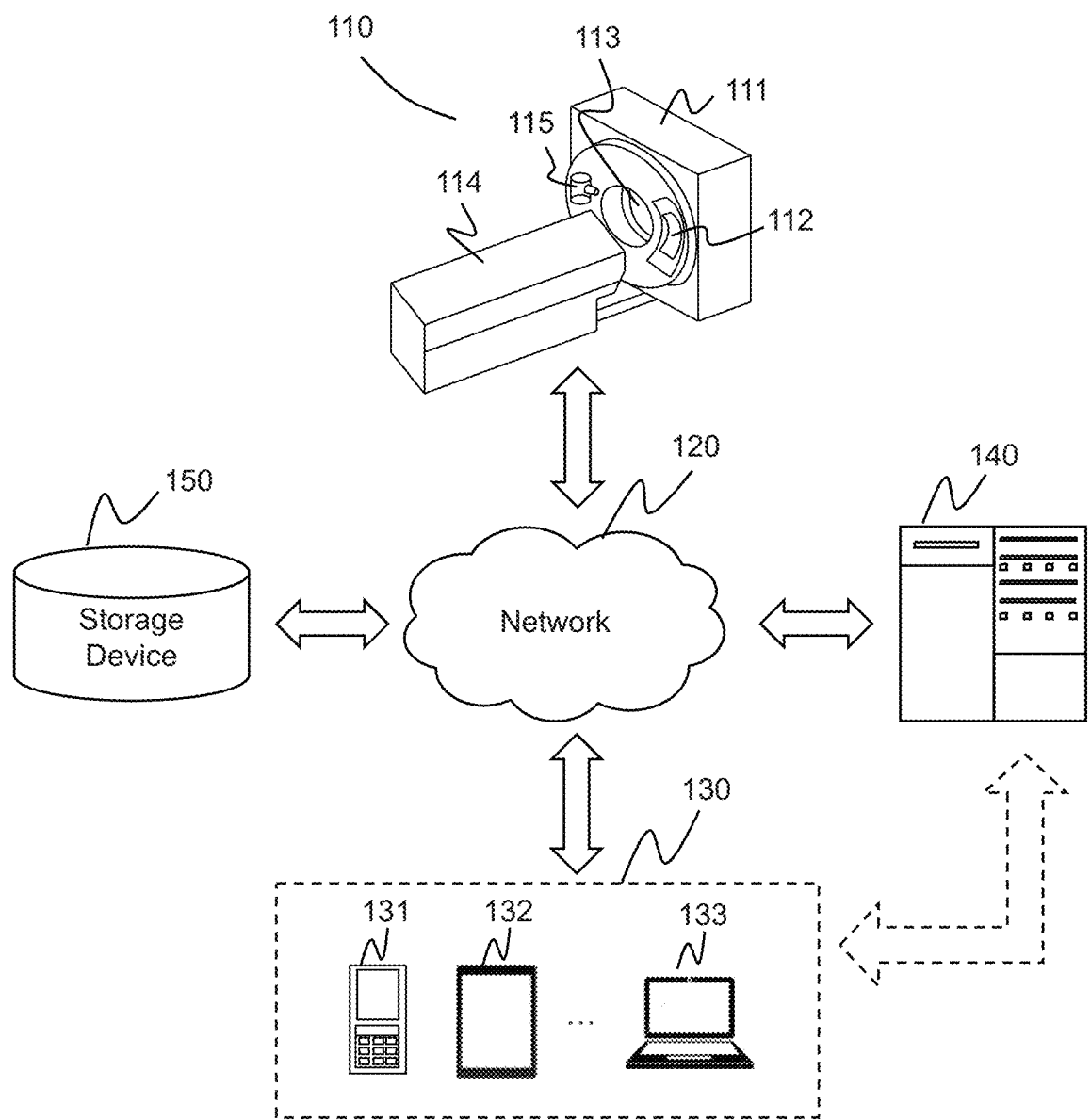
FIG. 1-A

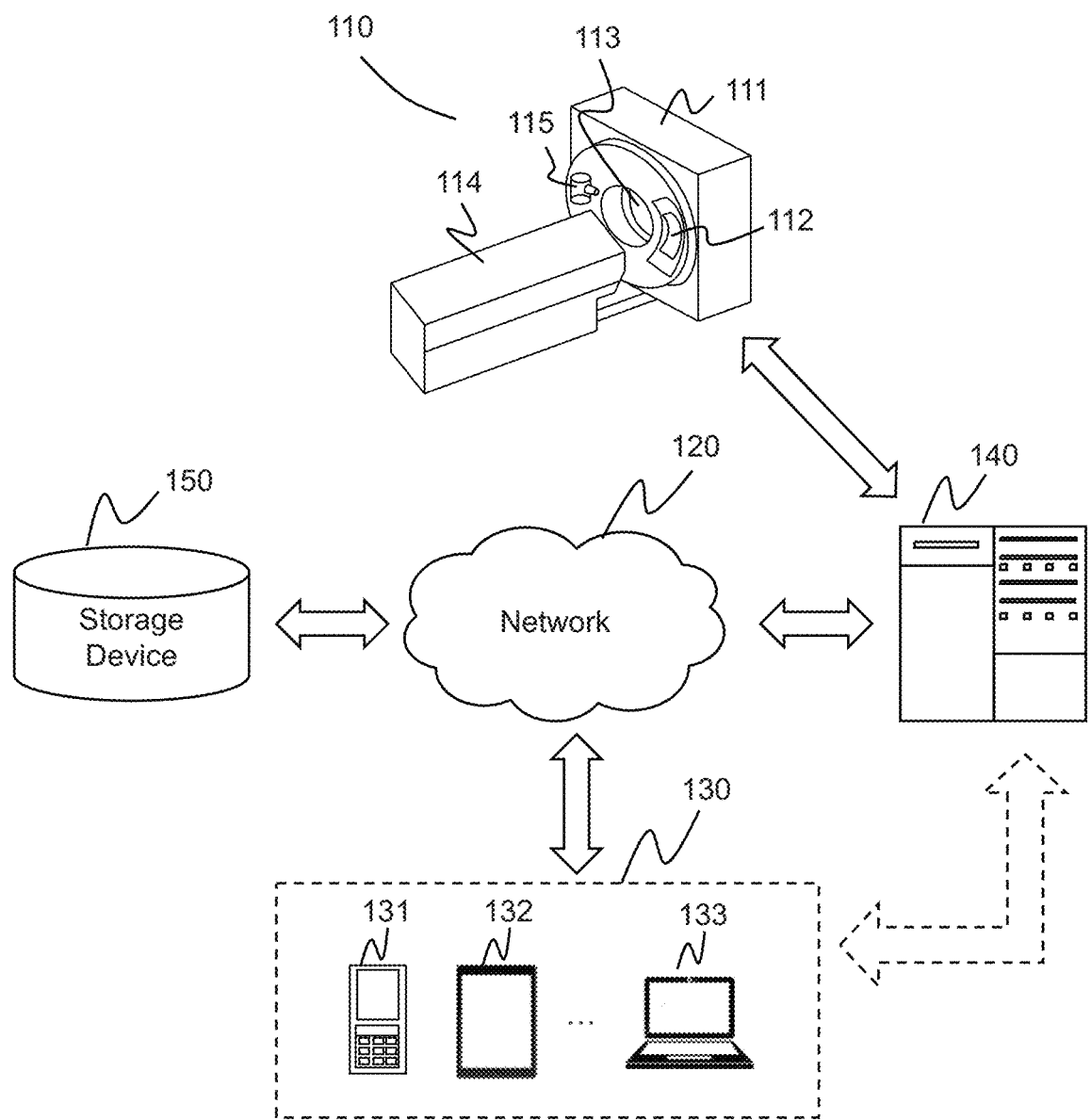
FIG. 1-B

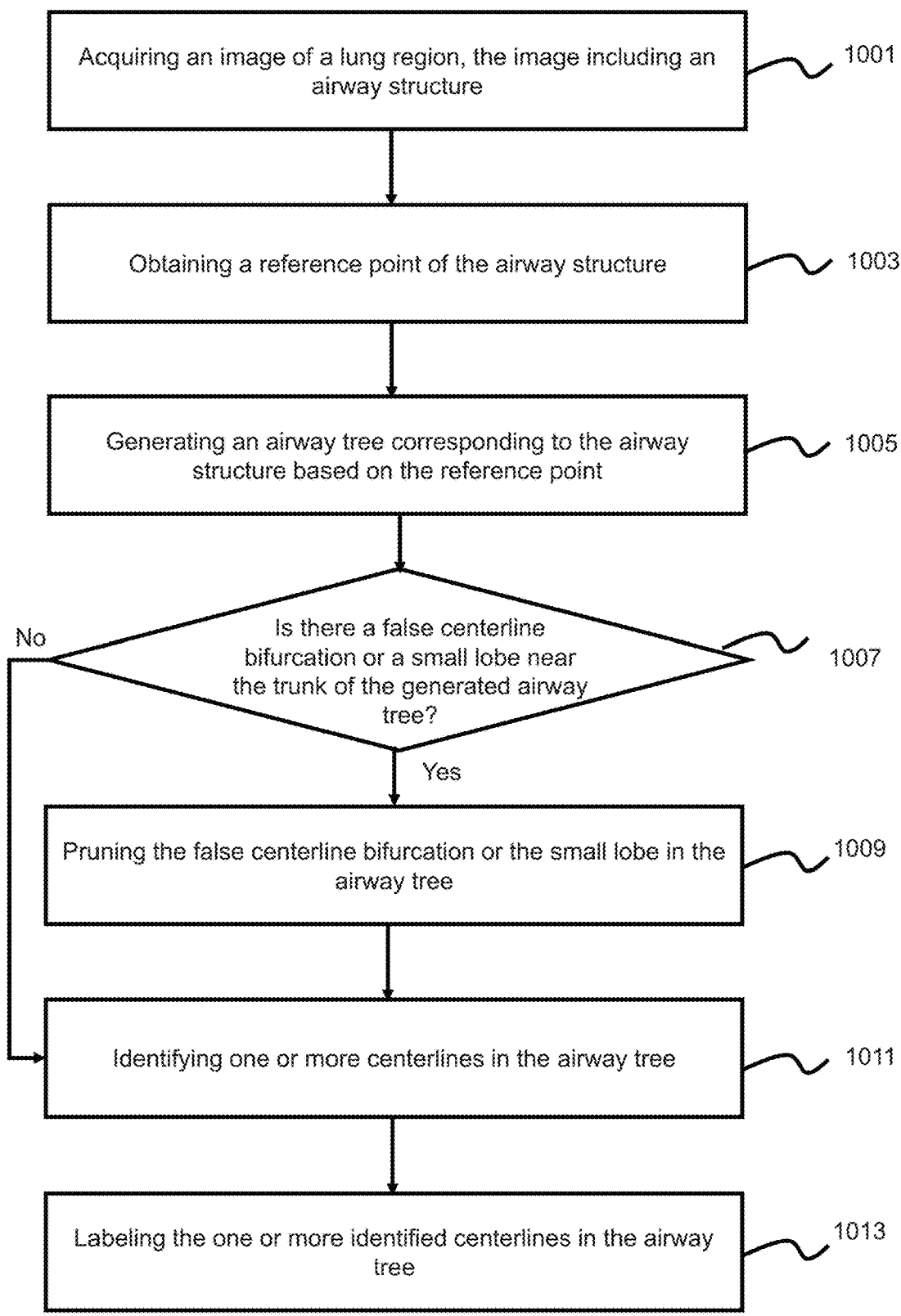
FIG. 10-A

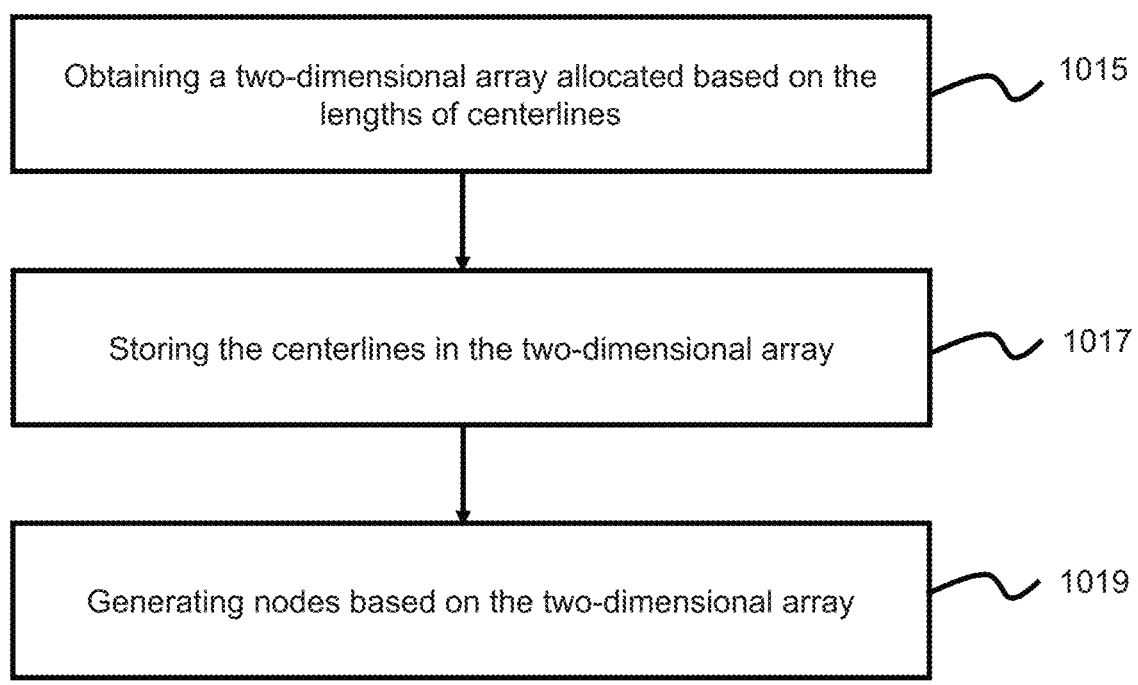
FIG. 10-B

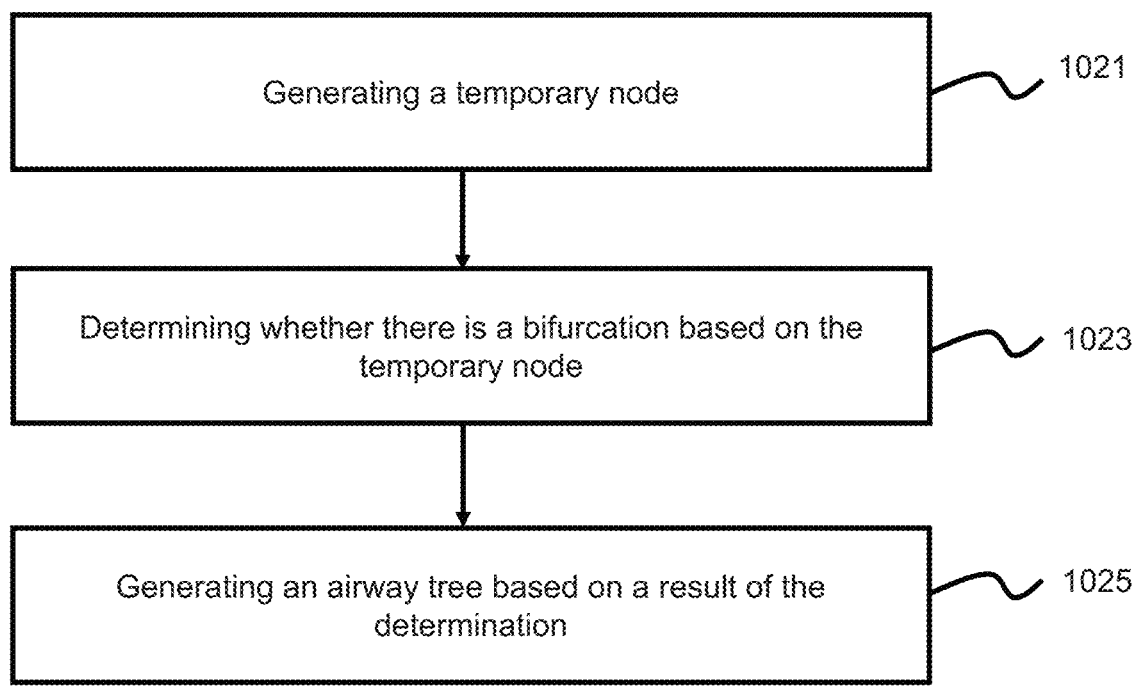
FIG. 10-C

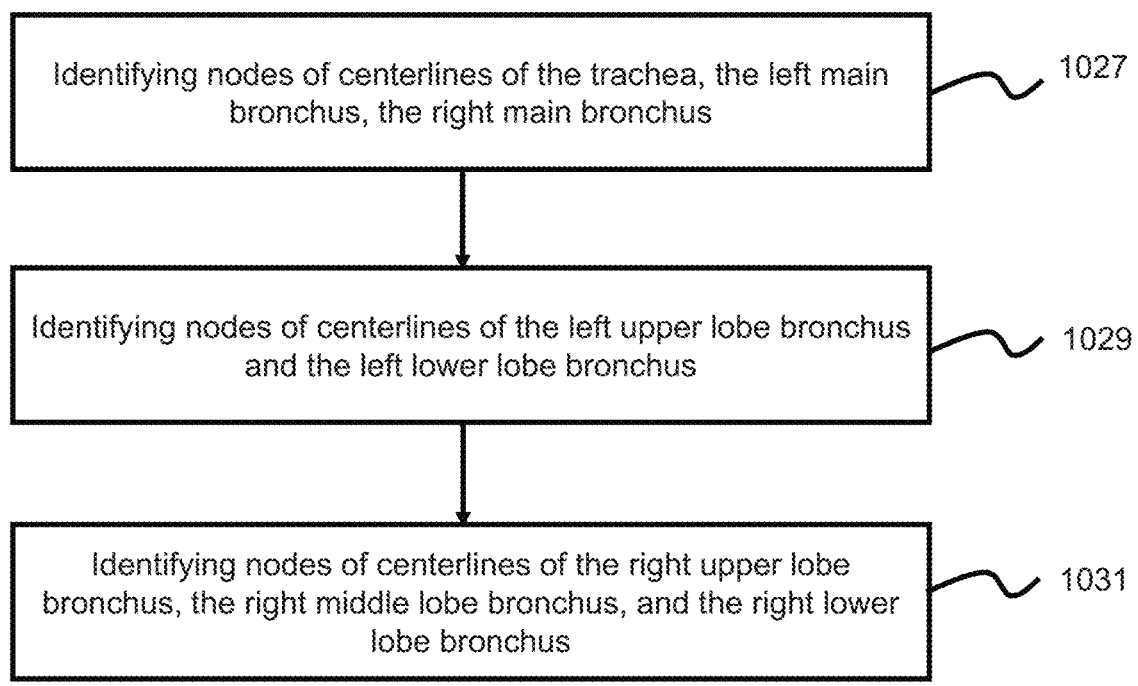
FIG. 10-D

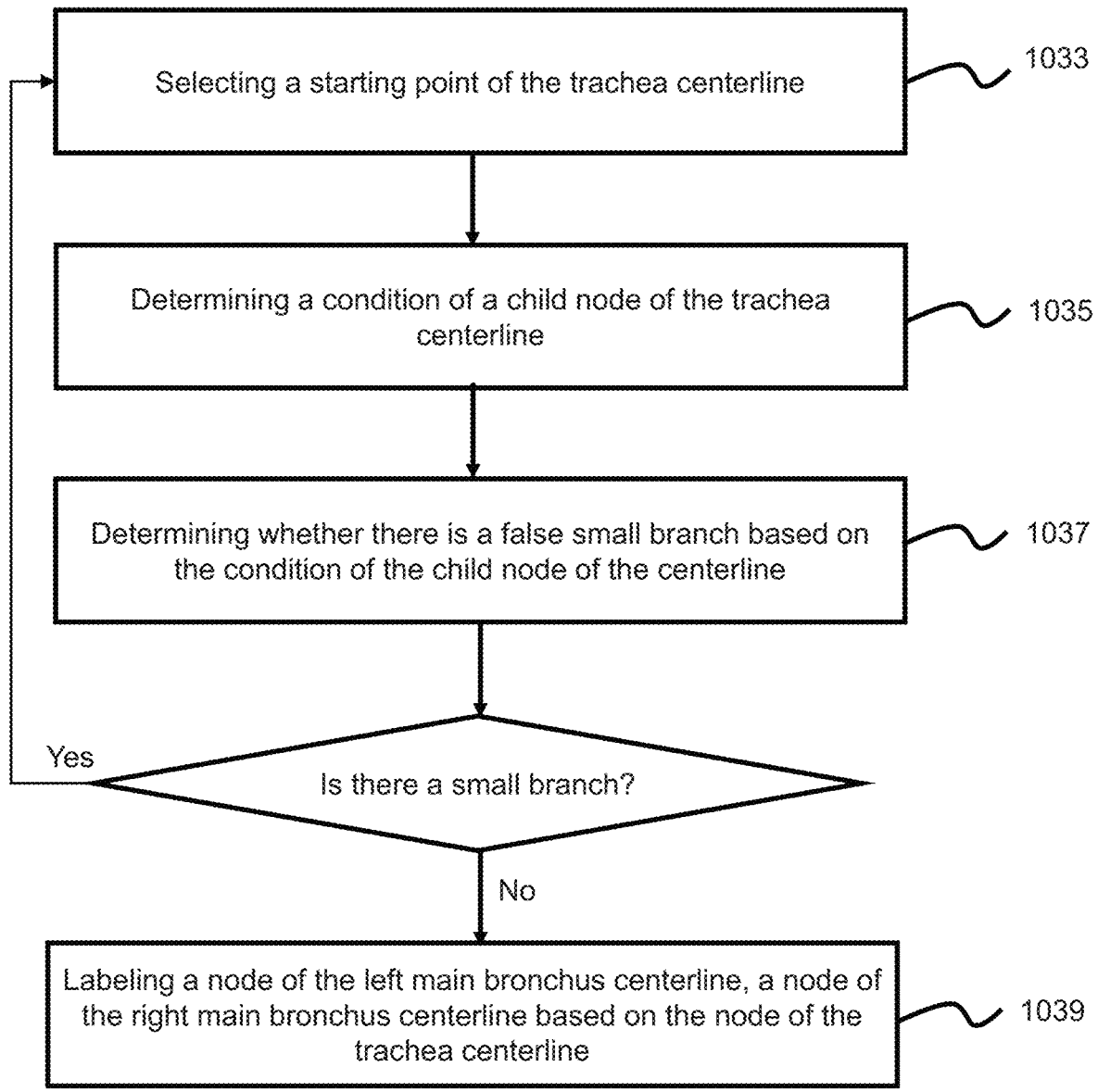
FIG. 10-E

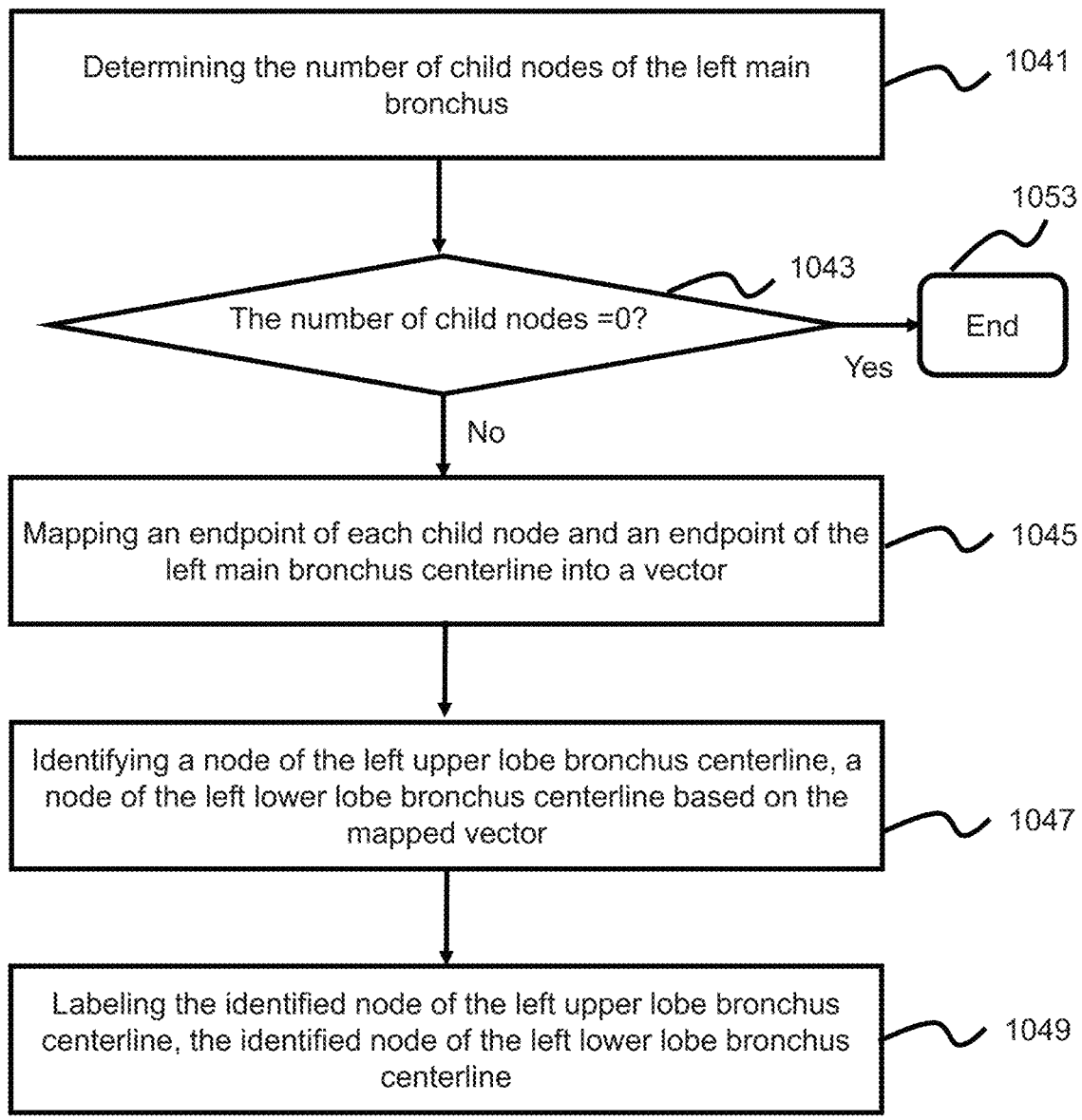
FIG. 10-F

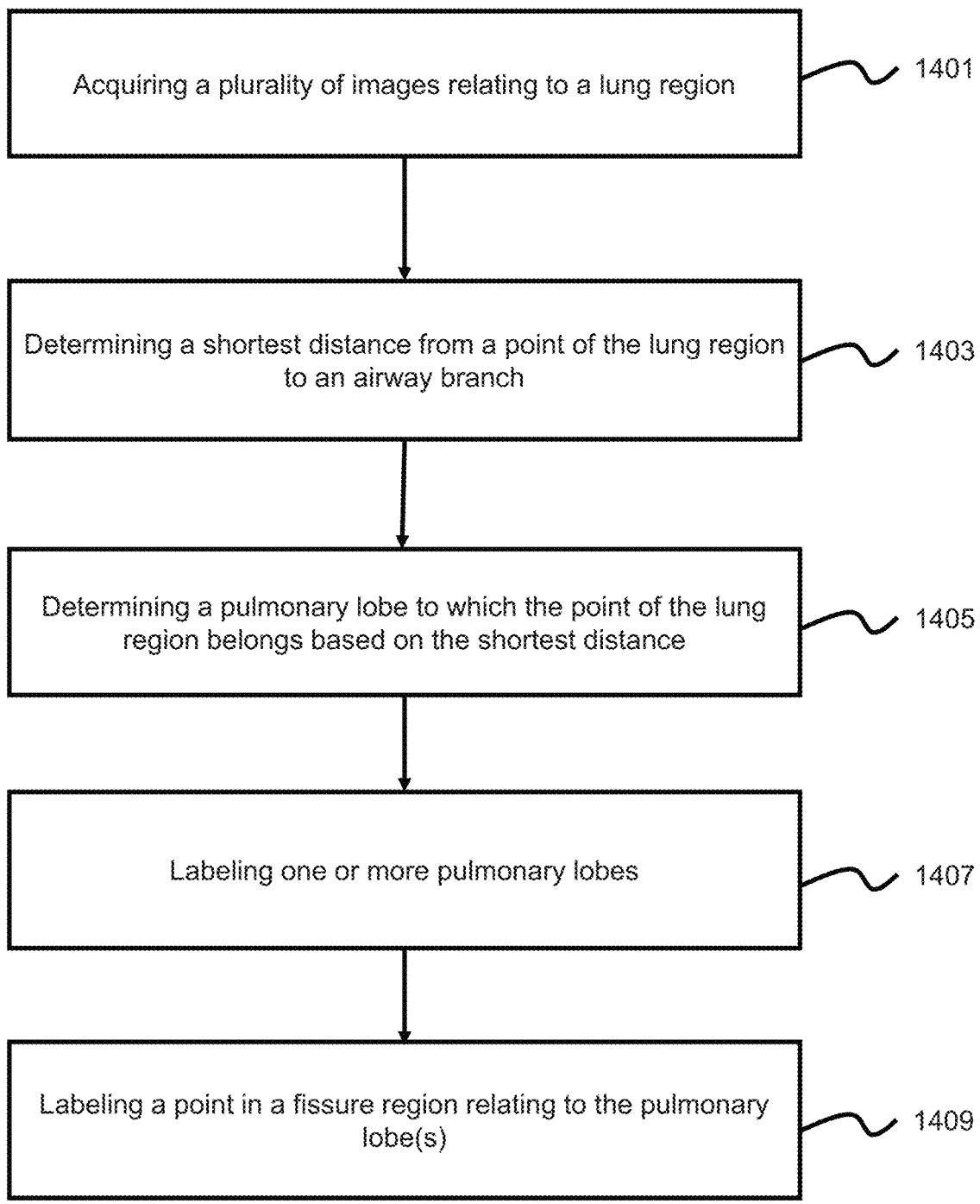
FIG. 14-A

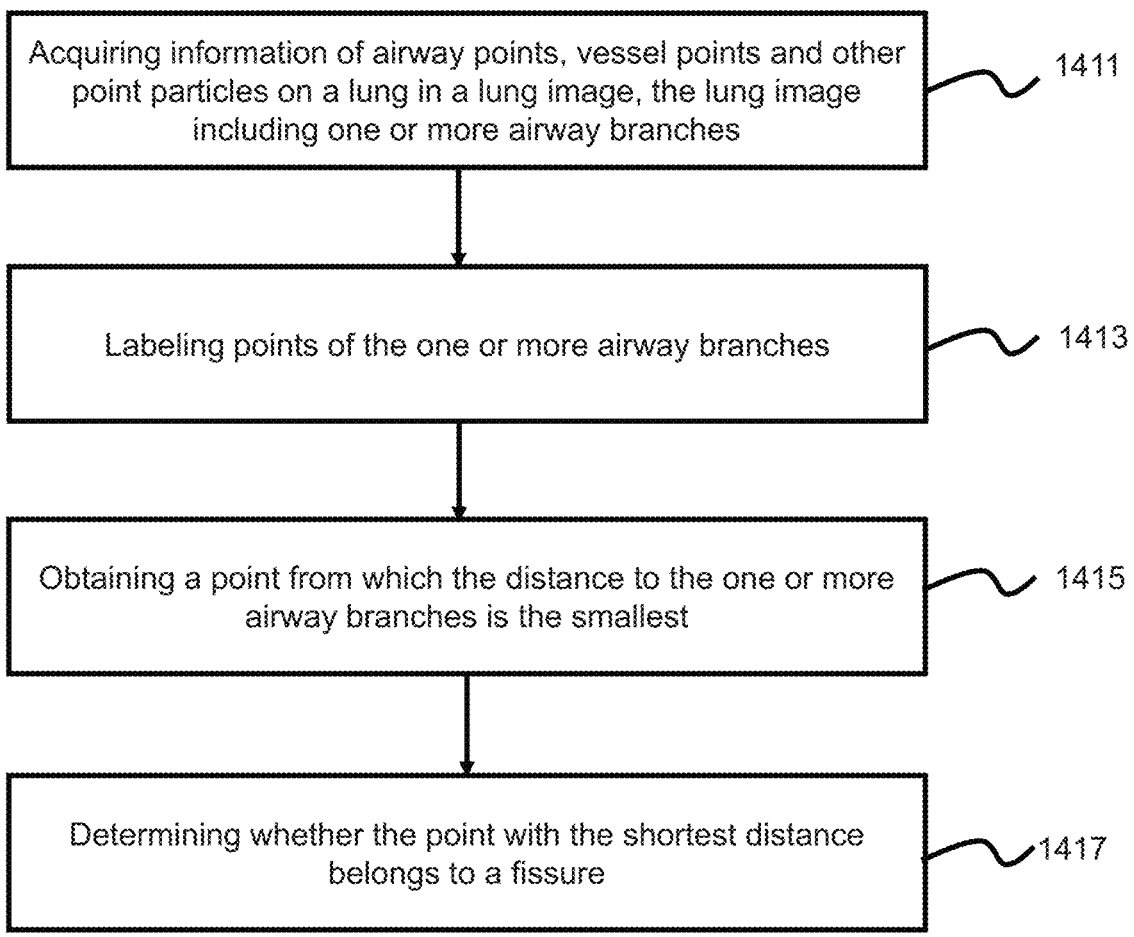
FIG. 14-B

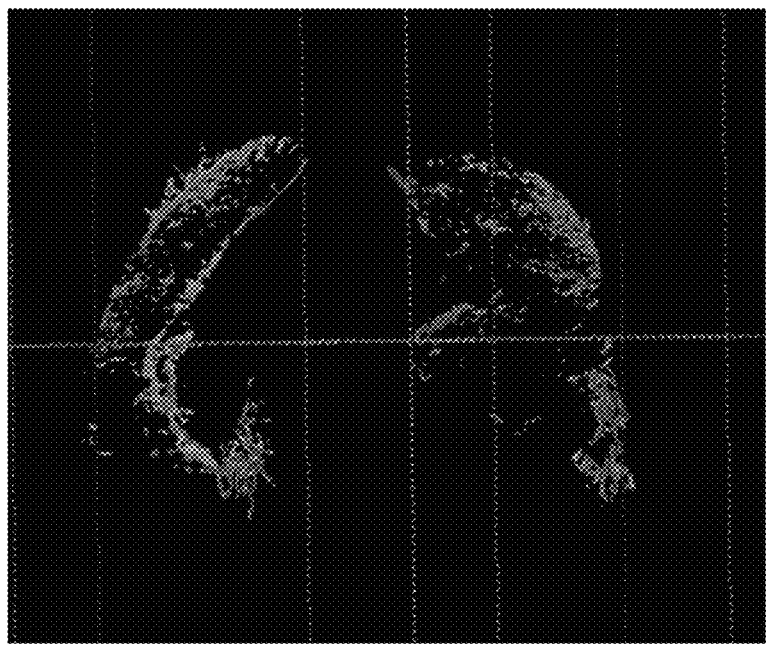
FIG. 17-A
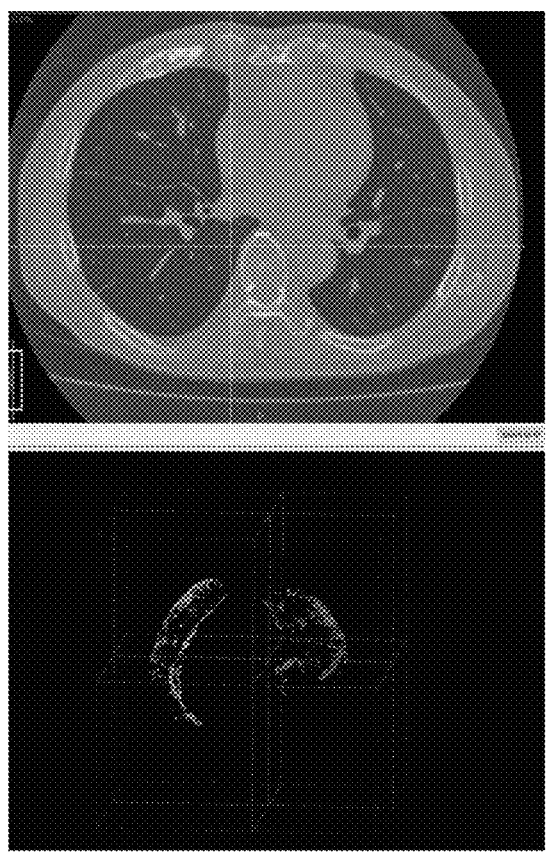
FIG. 17-B
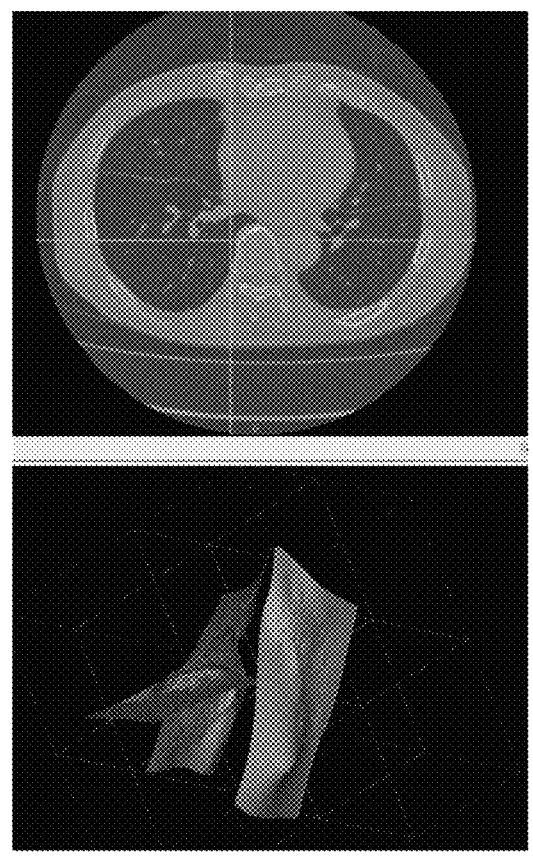
FIG. 17-C

METHODS AND SYSTEMS FOR IMAGE SEGMENTATION

CROSS-REFERENCE TO RELATED APPLICATIONS

The present application is a continuation of U.S. patent application Ser. No. 16/236,954 filed on Dec. 31, 2018, which is a continuation of International application No. PCT/CN2017/091329 filed on Jun. 30, 2017, the entire contents of which are hereby incorporated by reference.

TECHNICAL FIELD

The present application relates to an image processing system and method, and more particularly to a system and method for segmenting a lung image.

BACKGROUND

With a progressive increase of industrial activities, the natural environment becomes worse, which leads to the increasing incidence of lung diseases. Among the lung diseases, the lung cancer is a main killer to human health, meanwhile some lung diseases, such as lung fibrosis, pulmonary emphysema, local tracheostenosis, also always do harm to human health. Generally, the lung may be examined by a CT of the chest and the lung. The CT of the chest and the lung may fast and accurately collect three-dimensional anatomical structure information of lung tissues. After a segmentation process, the three-dimensional structure information of lung parenchyma, a lung airway tree, a lung vessel tree in the chest lung CT image may be intuitively presented. Moreover, a segmentation of pulmonary lobe may be performed on the lung parenchyma, and information related to different pulmonary lobes may be displayed to guide surgical planning and provide real-time guide for an interventional operation, and thereby to avoid or reduce the damage to an organ in a surgical. Since segmentation of lung segment is performed based on the pulmonary lobe segmentation, the study of the segmenting pulmonary lobe in CT images may have an important value in the practical application.

SUMMARY

According to an aspect of the present disclosure, a method for image segementation is provided. The method may include obtaining a target image relating to a lung region. The target image may include a plurality of image slices. The method may also include segmenting the lung region from the target image, and identifying an airway structure relating to the lung region. The method may further include identifying one or more fissures in the lung region, and determining, based on the airway structure and the one or more fissures, one or more pulmonary lobes in the lung region.

In some embodiments, the segmenting the lung region from the target image may include: identifying a characteristic slice among the plurality of image slices; determining a starting shoe and an end slice based on the characteristic slice; determining the lung region based on the starting slice and the end shoe; and determining a left lung or a right lung in the lung region.

In some embodiments, the identifying a characteristic slice among the plurality of image slices may include: determining a distribution of CT values of the plurality of image shoes; and selecting, based on the distribution, the characteristic slice.

In some embodiments, the CT values may vary in a range.

In some embodiments, the left lung or the right lung may be determined based on region growing.

In some embodiments, the identifying an airway structure relating to the lung region may include: obtaining a reference point of the airway structure; generating, based on the reference point, an airway tree corresponding to the airway structure; and identifying one or more branches of the airway tree, wherein a branch of the one or more branches of the airway tree may correspond to a branch of the airway structure.

In some embodiments, the identifying one or more branches of the airway tree may include: determining that a branch of the airway tree is false; and in response to the determination that the branch is false, pruning the false branch.

In some embodiments, the identifying one or more branches of the airway tree may also include labeling the branch of the airway structure based on the one or more identified branches of the airway tree.

In some embodiments, the identifying one or more branches of the airway tree may also include identifying at least one node of the airway tree, the node relating to a trachea, a left main bronchus, a right main bronchus, a left upper lobe bronchus, a left lower lobe bronchus, a right upper lobe bronchus or a right lower lobe bronchus.

In some embodiments, the identifying one or more fissures in the lung region may include: identifying a plurality of candidate fissures in the lung region; sorting at least a part of the plurality of candidate fissures based on a sorting algorithm; and merging at least some of the sorted candidate fissures.

In some embodiments, the identifying a plurality of candidate fissures in the lung region may include: determining a Hessian matrix corresponding to a voxel of the lung region; determining an Eigenvalue of the Hessian matrix; and designating, based on the Eigenvalue, that the voxel belongs to a candidate fissure of the plurality of candidate fissures.

In some embodiments, the merging at least some of the sorted candidate fissures may include: determining a plurality of values, each of the plurality of values corresponding to one candidate fissure of the plurality of candidate fissures; classifying, based on the plurality of values, the plurality of candidate fissures into at least two groups; and merging candidate fissures belonging to a same group.

In some embodiments, the plurality of values may include a plurality of Eigenvectors or a plurality of normal directions corresponding to the plurality of candidate fissures.

In some embodiments, the identifying one or more fissures in the lung region may also include fitting the merged candidate fissures to obtain the one or more fissures in the lung region.

In some embodiments, the determining one or more pulmonary lobes may include: determining a distance from a point of the lung region to the airway structure; and determining, based on the distance, a pulmonary lobe to which the point of the lung region belongs.

In some embodiments, the determining one or more pulmonary lobes may also include labeling the one or more pulmonary lobes based on the distance.

In some embodiments, the point of the lung region may be located in an expansion region of the one or more fissures.

According to another aspect of the present disclosure, a system for image segmentation is provided. The system may include: a lung segmentation module configured to obtain a target image relating to a lung region and segment the lung region in the target image; an airway identification module configured to identify an airway structure relating to the lung region; a fissure seamentation module configured to identify one or more fissures in the lung region; and a pulmonary lobe segmentation module configured to determine one or more pulmonary lobes based on the airway structure and the one or more fissures.

BRIEF DESCRIPTION OF THE DRAWINGS

The accompanying drawings are included to provide a further understanding of the present application and constitute a part of the present application. The exemplary embodiments and descriptions of the present application are used for explaining the present application and are not limited to the present application. In each figure, Ike reference numerals represent the same elements.

FIGS. 1-A and 1-B are schematic diagrams illustrating an operating environment of an image processing system according to some embodiments of the present application;

FIG. 10-A is an exemplary flowchart illustrating an airway identification process according to some embodiments of the present application;

FIG. 10-B is an exemplary flowchart illustrating a process of generating an airway tree according to some embodiments of the present application;

FIG. 10-C is an exemplary flowchart illustrating a process of generating an airway tree recursively according to some embodiments of the present application;

FIG. 10-D is an exemplary flowchart illustrating a process of identifying an airway tree centerline according to some embodiments of the present application;

FIG. 10-E is an exemplary flowchart illustrating a process of determining nodes corresponding to centerlines of the trachea, the left main bronchus or the right main bronchus according to some embodiments of the present application;

FIG. 10-F is an exemplary flowchart illustrating a process of determining a node corresponding to the left upper lobe bronchus centerline or the left lower lobe bronchus according to some embodiments of the present application;

FIG. 14-A is an exemplary flowchart illustrating a process of determining a pulmonary lobe according to some embodiments of the present application;

FIG. 14-B is an exemplary flowchart illustrating a process of identifying a pulmonary lobe according to some embodiments of the present application;

FIGS. 17-A to 17-C are schematic diagrams illustrating a fissure segmentation result according to some embodiments of the present application.

DETAILED DESCRIPTION

Figure 2:
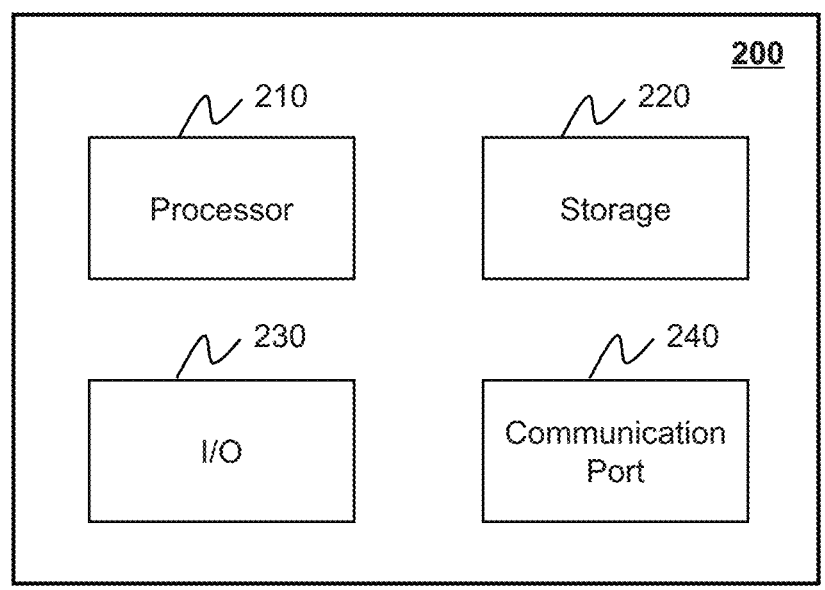
FIG. 2 is a schematic diagram illustrating a hardware and/or software structure of a computing device according to some embodiments of the present application.

In order to more clearly illustrate technical solutions of embodiments of the present application, drawings need to be used in the description of the embodiments will be briefly introduced. It is obvious that drawings in the following description are only some examples or embodiments of the present application and the present application may be applied to the other similar scenario according to these drawings for those skilled in the art without paying creative efforts. It should be understood that these exemplary embodiments are merely provided to give those skilled in the art a better understanding so as to implement the present invention, and are not intended to limit the present invention in any way. Unless it may be obvious from the language environment or otherwise specified herein, and like reference numerals in the figure represent the same structures or the same operation.

As shown in the present application and claim, the singular forms "a", "an" and "the" may be intended to include the plural forms as wed, unless the context dearly indicates otherwise. In general, it will be further understood that the terms "include", and "comprise" include operation and elements clearly identified, but do not exclude the presence or addition of operation and elements thereof, and a method or device may contain additional operation or elements.

Although some modules in the system according to the embodiments of the present application may be referenced in various manners by the present application, any number of different modules may be used and run on a client terminal and/or a server. The modules are only used for illustration, and different aspects of the system and method may use different modules.

The flowcharts used in the present application may illustrate operations executed by the system according to embodiments in the present application. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

In the present application, an image corresponding to an object (e.g., a tissue, an organ, a tumor, or the like of a body) or a portion thereof (e.g., a part corresponding to a region of interest in the image) may be referred to as "image", "partial image", or object itself. For example, a region of interest corresponding to a lung image may be described as "the region of interest may include a lung". As another example, a lung or a lung image may be described as "a lung image" or "a lung". For simplicity, the processing (such as, extraction, segmentation) of a partial image corresponding to an object may be described as "processing the object". For example, the segmenting a partial image corresponding to a fissure in an image may be described as "segmenting the fissure".

FIGS. 1-A and 1-B are schematic diagrams illustrating an imaging system 100 according to some embodiments of the present application. The imaging system 100 may include an imaging device 110, a network 120, an interactive device 130, a data processing engine 140, and a storage device 150. One or more components of the imaging system 100 may communicate with each other via the network 120. The imaging system 100 may include but not limited to a computed tomography (CT) system, a computed tomography angiography (CTA) system, a positron emission tomography (PET) system, a single-photon emission computerized tomography (SPECT) system, a magnetic resonance imaging (MRI) system, a digital subtraction angiography (DSA) system, a ultrasound scanning (US) system, a thermal texture maps (TTM) system, or the like.

The imaging device 110 may include a cavity 111, a detector 112, a detecting region 113, a table 114, and a radioactive scanning source 115, The cavity 111 may include a component for generating and detecting radioactive rays. In some embodiments, the cavity 111 may include the radioactive scanning source 115 and the detector 112. The table 114 may be used for supporting the scanned object. The radioactive scanning source 115 may emit radioactive rays to irradiate the object to be detected. The radioactive rays may penetrate the object and be received by the detector 112. For example, the radioactive scanning source 115 may be an X-ray tube.

The imaging device 110 may collect data by scanning a target. The scanned target may be an organ, a body, an object, a damaged part, a tumor, or the like, or any combination thereof. For example, the scanned target may be a head, a thorax, an abdomen, an organ, a skeleton, a vessel, or the like, or any combination thereof. As another example, the scanned target may be vessel tissues of one or more parts, a liver, or the like. The data collected by the imaging device 110 may be image data. The image data may be two-dimensional image data and/or three-dimensional image data. In a two-dimensional image, the slightest and distinguishable element may be a pixel. In a three-dimensional image, the slightest and distinguishable element may be a voxel. For a three-dimensional image, the image may include a series of two-dimensional slices or two-dimensional tomographic images. A point (or element) may be referred to as a voxel in a three-dimensional image, and also be referred to as a pixel in a corresponding two-dimensional tomographic image. The "voxel" and/or "pixel" may be provided merely for convenience of description, and may not intended to limit the two-dimensional and/or three-dimensional image.

In some embodiments, the imaging device 110 may send the collected data to the data processing engine 140 via the network 120. The network 120 may implement the internal communication of the imaging system 100, for example, the network 120 may receive external information of the system, or send information to the external of the system. In some embodiments, the imaging device 110, the interactive device 130, the data processing engine 140, and the storage device 150 may access the network 120 by wired or wireless connections, or any combination thereof. For example, the data processing engine 140 may acquire a user instruction from the interactive device 130 via the network 120. The network 120 may be either a single network or a combination of various networks. The network 120 may include but not limited to a local area network, a wide area network, a public network, a private network, a wireless local area network, a virtual network, a city metropolitan area network, a public switched telephone network, or the like, or any combination thereof. In some embodiments, the network 120 may include a variety of network access points, such as a wired or wireless access point, a base station or a network switching point. A data source may be connected to the network 120 via the above mentioned access points, and transmit information via the network 120.

The data processing engine 140 may include, but not limited to a central processing unit (CPU), an application specific integrated circuit (ASIC), an application specific instruction set processor (ASID), a physics processing unit (PPU), a digital processing processor (DSP), a field-programmable gate array (FPGA), a programmable logic device (PLD), a processor, a microprocessor, a controller, a microcontroller, or the like, or any combination thereof.

It should be noted that the data processing engine 140 may be actually included in the system, or implemented on a cloud computing platform to realize its functions. The cloud computing platform may include but not limited to a storage-type cloud platform for data storage, a computing-type cloud platform for processing data, and a synthetic cloud platform based for data storage and processing. The cloud platform used in the imaging system 100 may be a public cloud, a private cloud, a community cloud, a hybrid cloud, or the like. For example, according to the practical needs, a medical image received by the imaging system 100 may be processed and/or stored by the cloud platform and a local processing module and/or corresponding components in the imaging system 100.

The interactive device 130 may receive, send and/or display data or information. In some embodiments, the interactive device 130 may have some and all functions of the data processing engine 140, For example, the interactive device 130 may further process a processing result generated by the data processing engine 140, or may display the processed data generated by the data processing engine 140. In some embodiments, the interactive device 130 and the data processing engine 140 may an integrated device. The integrated device may simultaneously realize the functions of the data processing engine 140 and the interactive device 130. In some embodiments, the interactive device 130 may include but not limited to an input device, an output device, or the like, or a combination thereof. The input device may include but not limited to a character input device (e.g., a keyboard), an optical reader (e.g., an optical indicia reader, an optical character reader), a graph input device (e.g., a mouse, an operating stem, a light pen), an image input device (e.g., a camera, a scanner, a fax machine), an analog input device (e.g., a language analog-to-digital converting system), or the Ike, or any combination thereof. The output device may include but not limited to a display device, a printing device, a plotting device, an audio output system, a voice output system, a magnetic recording device, or the Ike, or any combination thereof. In some embodiments, the interactive device 130 may be a device having the input and output function, for example, a desktop computer, a notebook, a smart telephone, a tablet, a personal digital assistance (PDA), or the like. In some embodiments, the interactive device 130 may include a mobile device 131, a tablet computer 132, a notebook computer 133, or the like, or any combination thereof. In some embodiments, the mobile device 131 may include a smart home device, a wearable device, a mobile device, a virtual reality device, an augmented reality device, or the like, or any combination thereof. The smart home device may include a smart lighting device, a control device of a smart electrical device, a smart monitoring device, a smart television, a smart video camera, an interphone, or the like, or any combination thereof. The wearable device may include a smart bracelet, a smart glass, a smart helmet, a watch, cloth, a backpack, a smart adjunct, or the like, or any combination thereof. The mobile device may include a mobile telephone, a personal digital assistance (PDA), a game device, a navigation device, a point of sale (POS) device, a notebook computer, a tablet, a desktop, or the like, or any combination thereof. The virtual reality device and/or the augmented reality device may include a virtual reality helmet, a virtual reality glass, a virtual reality blinder, an augmented reality helmet, an augmented reality glass, an augmented reality blinder, or the like, or any combination thereof. For example, the virtual reality device and/or augmented reality device may include Google Glass™, Oculus Rift™, Hololens™, Gear VR™, or the like.

The data processing engine 140 may process data. The data may include image data, user input data, etc. The image data may be two-dimensional image data, three-dimensional image data, etc. The user input data may include a data processing parameter (e.g., a slice thickness, an interslice distance, the number of slices, or the Ike), an instruction relating to the system, etc. The data may be collected by the imaging device 110, retrieved from the storage device 150, obtained from the interactive device 130 via the network 120, or the like. In some embodiments, the data processing may include data acquiring, data classification, data filtering, data converting, data determining, data displaying, or the like, or any combination thereof. The data processing engine 140 may transmit the processed data to the storage device 150 for storing, or transmit the processed data to the interactive device 130. For example, the data processing engine 140 may process image data, and transmit the processed image data to the interactive device 130 for display.

The storage device 150 may be configured in a device having a storage function. The storage device 150 may store data collected from the imaging device 110 (e.g., image data acquired by the imaging device 110) and various data produced when the data processing engine 140 operates. The storage device 150 may also store data input via the interactive device 130 (user input data). The storage device 150 may be local or remote. In some embodiments, the storage device 150 may be configured in the data processing engine 140. The storage device 150 may include a sliceed database, a network-type database, a relational database, or the like, or any combination thereof. The storage device 150 may digitize the information, and store the digitalized information by an electrical storage device, a magnetic storage device, or an optical storage device. The storage device 150 may be used for storing various information, for example, programs, data, etc. The storage device 150 may be configured in a device storing information in the form of electric energy (e.g., various memories, a random access memory (RAM), a read only memory (ROM)). The random access memory may include but not limited to a decade counter tube, a selectron tube, a delay line memory, a williams tube, a dynamic random access memory (DRAM), a static random access memory (SRAM), a thyristor-based random access memory (T-RAM), a zero-capacitor random access memory (Z-RAM), or the like, or any combination thereof. The read only memory may include but not limited to a magnetic bubble memory, a magnetic button-wire memory, a film memory, a magnetic plated wire memory, a magnetic core memory, a drum memory, an optical disc drive, a hard disk, a magnetic tape, a non-volatile random access memory (NVRAM), a phase-change memory, a magnetoresistive random access memory, a ferroelectric random access memory, a nonvolatile SRAM, a flash memory, an electrically-erasable programmable read only memory, an erasable programmable read only memory, a programmable read-only memory, a mask read-only memory, a floating connection gate random access memory, a nanometer random access memory, a racetrack memory, a resistive random access memory, a programmable metallization memory cell, or the like, or any combination thereof. The storage device 150 may be configured in a device storing information in the form of magnetic energy (e.g., a hard disk, a floppy disk, a magnetic tape, a magnetic core memory, a magnetic bubble memory, a USB flash disk, a flash memory, etc.). The storage device 150 may be configured in an optical storage device (e.g., CD, DVD, etc.). The storage device 150 may be configured in a magneto-optical storage device (e.g., a magneto-optical disk, etc.). The data accessing modes of the storage device 150 may include a random access mode, a serial access mode, a read-only mode, or the Ike, or any combination thereof. The storage device 150 may be configured in a non-permanent storage device, or a permanent storage device. The storage devices described above are merely examples, and the storage devices used in the imaging system 100 are not limited thereto.

It should be noted that the description of the imaging system 100 is merely provided for convenience of description, and are not intended to limit the scope of the present application to the illustrated embodiments. It would be understood that for those skilled in the art, after understanding the principle of the system, various modules may be combined, or form a subsystem and connect to other modules, and modifications and changes may be made in the form and details of the method and system described above. Those variations and modifications do not depart from the principle of the present disclosure. For example, the storage device 150 may be configured in a cloud computing platform having data storage functions. The cloud computing platform may include but not limited to a public cloud, a private cloud, a community cloud, a hybrid cloud, or the like. As another example, two or more of the imaging device 110, the data processing engine 140, the storage device 150, and the interactive device 130 may be directly configured in a device and communicate with each other without the presence of the network 120. Those modifications do not depart from the scope of the present disclosure, FIG. 2 is a schematic diagram illustrating a hardware and/or software component of a computing device 200 in the data processing engine 140. As shown in FIG. 2, the computing device 200 may include a processor 210, a memory 220, an input/output 230, and a communication port 240.

The processor 210 may execute a computer instruction related to the present application, or implement functions of the data processing engine 140. The computer instruction may include a program execution instruction, a program termination instruction, a program operating instruction, a program execution path, etc. In some embodiments, the processor 210 may process image data obtained from the imaging device 110, the interactive device 130, the storage device 150, and/or any other component in the imaging system 100. In some embodiments, the processor 210 may include one or more hardware processors, such as a microcontroller, a microprocessor, a reduced instruction set computer (RISC), an application specific integrated circuit (ASIC), an application-specific instruction-set processor (ASIP), a central processing unit (CPU), a graphic processing unit (GPU), a physics processing unit (PPU), a microprocessor unit, a digital signal processor (DSP), a field programmable gate array (FPGA), an advanced RISC machine (ARM), a programmable logic device, or any circuits or processors capable of executing one or more functions.

The memory 220 may store data and/or information obtained from the imaging device 110, the interactive device 130, the storage device 150, and/or any other component in the imaging system 100. In some embodiments, the memory 220 may include a mass memory, a removable memory, a volatile read-and-write memory, a read only memory (ROM), or the like, or any combination thereof. For example, a large capacity memory may include a magnetic disk, an optical disk, a solid state drive, etc. The removable memory may include a flash memory drive, a floppy disk, an optical disk, a memory card, a compact disc, a magnetic tape, etc. The volatile read-and-write memory may include a random access memory (RAM). The RAM may include a dynamic RAM (DRAM), a double rate synchronized dynamic RAM (DDR SDRAM), a static RAM (SRAM), a thyristor-RAM (T-RAM), a zero capacitor RAM (Z-RAM), etc. The ROM may include a mask ROM (MROM), a programmable ROM (PROM), an erasable programmable ROM (EPROM), an electrically-erasable programmable ROM (EEPROM), a compact-disc ROM (CD-ROM), a digital versatile disc ROM, etc. In some embodiments, the memory 220 may store one or more programs and/or instructions.

The input/output 230 may input and/or output data. In some embodiments, a user may interact with the data processing engine 140 through the input/output 230. In some embodiments, the input/output 230 may include an input device and an output device. The input device may include a keyboard, a mouse, a touch screen, a microphone, or the like, or any combination thereof. Examples of the output device may include a display device, a loudspeaker, a printer, a projector, or the like, or any combination thereof. The display device may include a liquid crystal display, a light emitting diode based display, a flat panel display, a curving screen, a television device, a cathode ray tube, a touch screen, or the like, or any combination thereof.

The communication port 240 may be connected to a network (e.g., the network 120) for data communication. The communication port 240 may establish connections among the data processing engine 140, the imaging device 110, the interactive device 130, and/or the storage device 150. The connections may be wired and/or wireless connections. The wired connections may include, for example, a cable, an optical fiber cable, a phone line, or the like, or any combination thereof. The wireless connections may include, for example, a blue tooth connection, a wireless network connection, a WLAN link, a ZigBee connection, a mobile network connection (e.g., 3G, 4G, 5G network, etc.), or the like, or any combination thereof. In some embodiments, the communication port 240 may be and/or include a standardized communication port, for example, RS232, RS485, etc. In some embodiments, the communication port 240 may be a specially designed communication port. For example, the communication port 240 may be designed based on the digital medical imaging and the communication protocol.

Figure 3:
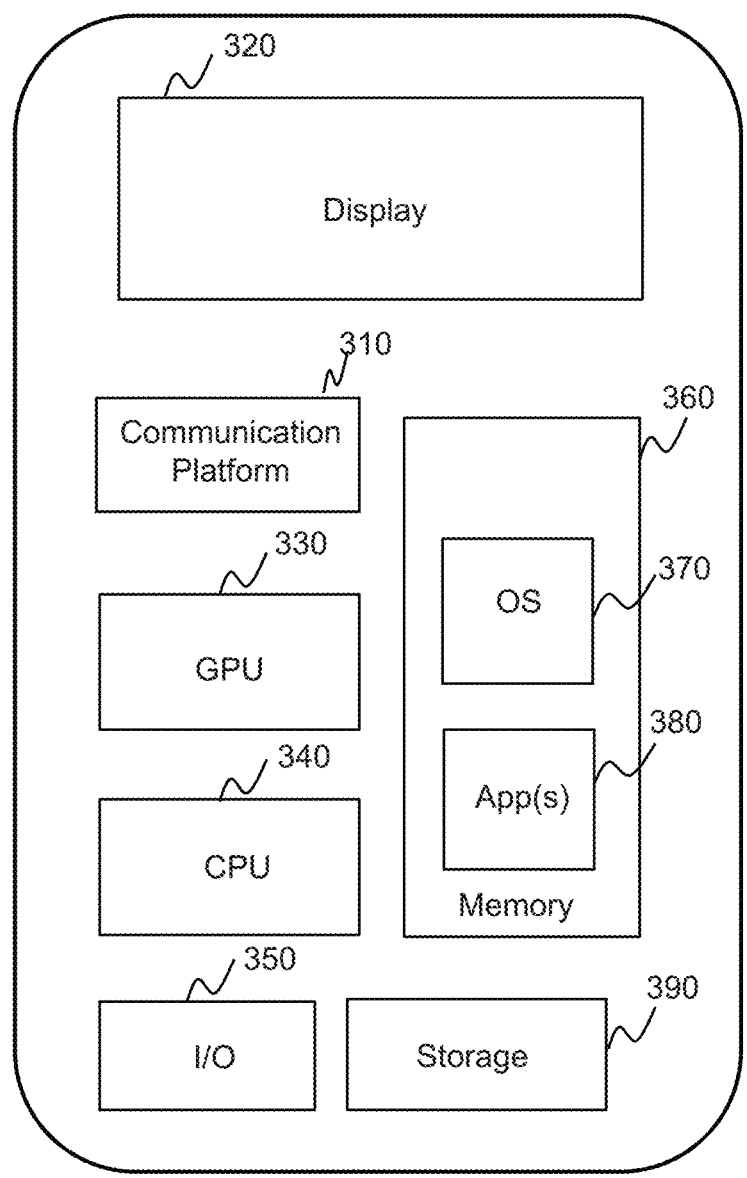
FIG. 3 is a schematic diagram illustrating a software and/or hardware structure of an interactive device according to some embodiments of the present application.

FIG. 3 is a schematic diagram illustrating a hardware and/or software of a mobile device 300. In some embodiments, the interactive device 130 may be implemented on the mobile device 300. As shown in FIG. 3, the mobile device 300 may include a communication platform 310, a display device 320, a graphics processing unit 330, a central processing unit 340, an input/output 350, a memory card 360, and a memory 390. In some embodiments, the mobile device 300 may include a bus line or a controller. In some embodiments, a mobile operating system 370 and one or more application programs 380 may be loaded into the memory card 360 from the memory 390, and be executed by the central processing unit 340. The application program 380 may include a browser. In some embodiments, the application program 380 may receive and display information related the image processing of the data processing engine 140. The input/output 350 may implement interactions between the user and the imaging system 100, and provide information related to the interaction to other components (e.g., the data processing engine 140) of the imaging system 100 via the network 120.

Figure 4:
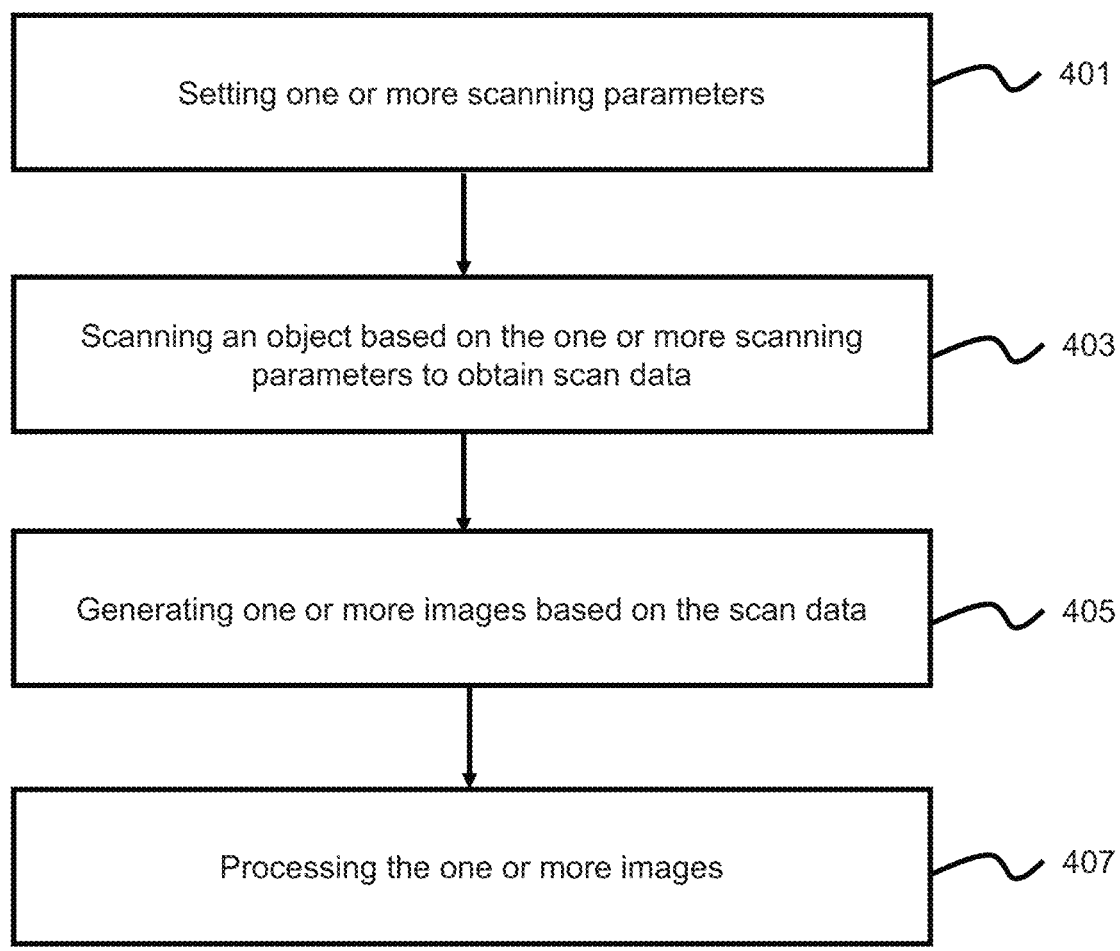
FIG. 4 is a schematic diagram illustrating a data processing engine according to some embodiments of the present application.

FIG. 4 is an exemplary flowchart for generating an image according to some embodiments of the present application. The process 400 may be implemented by the imaging system 100 or one or more components of the imaging system 100. For example, the process 400 may be implemented by the data processing engine 140 based on data obtained by the imaging device 110. In 401, one or more scan parameters may be set. The parameter setting may be implemented by the imaging device 110. In some embodiments, the scan parameter(s) may include a scan time, location information of a target, a position of a gantry, a rotation speed of the gantry, an intensity of voltage and/or current, or the like, or any combination thereof. As an example, during the scanning process, the table 114 may be adjusted according to the position of the scanned object, so that the scanned object may be located at a special position in the cavity 111. As another example, the radioactive scanning source 115 and/or the detector 112 in the cavity 111 may be moved to scan the scanned object. In some embodiments, the scan parameter(s) may be automatically selected by the system according to a default setting, or be set by a user (e.g., a doctor, a nurse). The scan parameter(s) set according to the default setting of the system may be stored in a storage device of the imaging system 100 or an external storage device, for example, the storage device 150. The user may set the scan parameter(s) according to a position, a size, and/or a shape of the scanned object. The scanned object may include an organ, a tissue, a lesion site, a tumor site, or any combination thereof. For example, the scanned object may be a lung, a head, a chest, an abdomen, a heart, a liver, an upper limb, a lower limb, a vertebra, a skeleton, a vessel, or the like, or any combination thereof.

In 403, the scanned object may be scanned to obtain scan data based on the one or more scan parameters. The scanning process may be completed by the imaging device 110. In some embodiments, the radioactive scanning source 115 and the detector 112 may scan the object. The radioactive rays generated by the radioactive scanning source 115 may penetrate the object, and be received by the detector 112 after being absorbed by the scanned object. In some embodiments, the scan data may be either real-time, or be historical. The real-time scan data may include data generated during scanning the scanned object in real time. The historical scan data may include data obtained from an external data source.

In 405, one or more images may be generated based on the scan data. The generated image may include an MRI image, a CT image, a PET image, or the like, or any combination thereof. The generated image may include a two-dimensional or three-dimensional image. The image may be obtained after the scan data is reconstructed.

In 407, the one or more images may be processed. In some embodiments, the image processing may include an image filtering, an image greyscale normalization, a horizontal rotation, a size adjustment, etc. In some embodiments, the image processing may include identifying or segmenting a region of interest in the image(s). Further, a plurality of ROIs may be identified or segmented in the image(s), and the identified or segmented ROIs may be labeled. Furthermore, the one or more images may be transmitted to any device in the imaging system 100 or any external device, for example, the storage device 150, etc. The one or more images may be displayed by the display device 160.

It should be noted that the description of the imaging generation is merely provided for convenience of description, and the embodiments are not intended to limit the scope of the present application. It would be understood for those skilled in the art that after understanding the principle of the system, various operations may be exchanged or combined, and various modifications and changes may be made to the form and details of the method and system described above. Those variations and modifications do not depart from the principle of the present disclosure. In some embodiments, the acquired scan data may be stored and backed up. The storing and backup operation may be added between any two operations in the flowchart. In some embodiments, one or more operations or processing conditions may be added between the operation 403 of acquiring the scan data and the operation 405 of generating the image(s).

Figure 5:
FIG. 5 is a schematic diagram illustrating a lung segmentation module according to some embodiments of the present application.

FIG. 5 is a schematic diagram of a lung segmentation engine according to some embodiments of the present application. In some embodiments, the lung segmentation engine may be implemented on the data processing engine 140. The lung segmentation engine 500 may include a lung segmentation module 510, an airway identification module 520, a fissure segmentation module 530, and a pulmonary lobe segmentation module 540.

The lung segmentation module 510 may acquire and segment image including a lung. For example, the lung segmentation module 510 may acquire one or more images including a lung. The image(s) may include an MRI image, a CT image, a PET image, or any combination thereof. The image(s) may be obtained by scanning a scanned object. As another example, the lung segmentation module 510 may segment a lung region from the one or more images. The lung region may include a left lung region and a right lung region. Detail description about the lung region segmentation may be found elsewhere of the present application, for example, FIG. 6 and description thereof. In some embodiments, the lung segmentation module 510 may further determine image slices relating to the lung region (e.g., a lung characteristic slice, a lung starting slice, and a lung end slice), the left lung region, or the right lung region. Detail description about the image slices, the left lung region and the right lung region may be found elsewhere of the present application, for example, FIG. 6 and description thereof. In some embodiments, the lung segmentation module 510 may perform image segmentation based on one or more image segmentation techniques. The one or more image segmentation techniques may include but not limited to a threshold segmentation technique, a clustering segmentation algorithm, a region growing segmentation technique, an image-shape-based image registration technique, a watershed segmentation technique, a fuzzy C-means algorithm, etc.

The airway identification module 520 may identify an airway structure relating to the lung image. The airway structure may include a structure of the trachea, the left main bronchus or the right main bronchus. The airway identification module 520 may determine an airway centerline. The airway centerline may include the trachea centerline, the left main bronchus centerline, the right main bronchus centerline, the left upper lobe centerline, the left lower lobe bronchus centerline, the right upper lobe centerline, the right middle lobe centerline, the right lower lobe bronchus centerline, or any combination thereof. The airway identification module 520 may further label corresponding airway based on the identified airway centerlines. For example, airways corresponding to the different airway centerlines may be labeled as different values. The labelled values of the airways may be set by a user, or may be by one or more components (e.g., the data processing engine 140) in the imaging system 100. In some embodiments, the airway identification module 520 may prune a false centerline bifurcation or a small lobe near the trunk of an airway tree. The airway identification module 520 may extract information relating to the airway structure. The information may include an airway position, an airway centerline, an airway centerline length, a node corresponding to the airway centerline, a cosine value between the airway centerlines, etc. In some embodiments, the airway identification module 520 may identify the airway structure based on the lung image processed by the lung segmentation module 510. Detailed description about the identification of the airway structure may be found elsewhere of the present application (e.g., FIGS. 6 and 10 and the description thereof).

The fissure segmentation module 530 may segment one or more fissures in the lung image. In some embodiments, the fissure segmentation module 530 may acquire candidate fissures from a plurality of image slices relating to the lung image. The candidate fissures may be obtained by enhancing the lung image. In some embodiments, the fissure segmentation module 530 may perform a region growing based on the candidate fissures. For example, the region growing may be performed based on a position, a greyscale, a color, a texture, a shape of a fissure region. In some embodiments, the fissure segmentation module 530 may merge the candidate fissures. The fissures may be merged based on a classification algorithm (e.g., a clustering analysis algorithm). The merged candidate fissures may be further fitted to obtain a fissure curved surface. In some embodiments, the fissure segmentation module 530 may perform the fissure segmentation based on the lung image processed by the lung segmentation module 510 and/or the airway identification module 520.

The pulmonary lobe segmentation module 540 may segment one or more pulmonary lobes. The pulmonary lobe(s) may be segmented based on a shortest distance between each point in the lung image and an airway branch. The shortest distance may be determined based on a Dijkstra algorithm. In some embodiments, the pulmonary lobe segmentation module 540 may determine a pulmonary lobe to which the point belongs based on the shortest distance. In some embodiments, the pulmonary lobe segmentation module 540 may add a label (e.g., a color label) on a position of a fissure related to the pulmonary lobe(s). The position of the fissure may be a slice that does not have a color label in the pulmonary lobe. In some embodiments, the pulmonary lobe segmentation module 540 may segment the pulmonary lobe based on the lung image processed by the lung segmentation module 510, the airway identification module 520, or the fissure segmentation module 530.

It should be noted that the description of the lung segmentation engine 500 is merely provided for convenience of description, and the embodiments are not intended to limit the scope of the present application. It would be understood for those skilled in the art that after understanding the principle of the system, various modules may be combined, or form a subsystem to connect other modules without departing from this principle. For example, a storage unit may be added in each module of the lung segmentation engine 500. The storage unit may be used for storing intermediate data or a processing result generated by each module. As another example, one or more modules in the lung segmentation engine 500 may be integrated into one module to implement the functions thereof.

Figure 6:
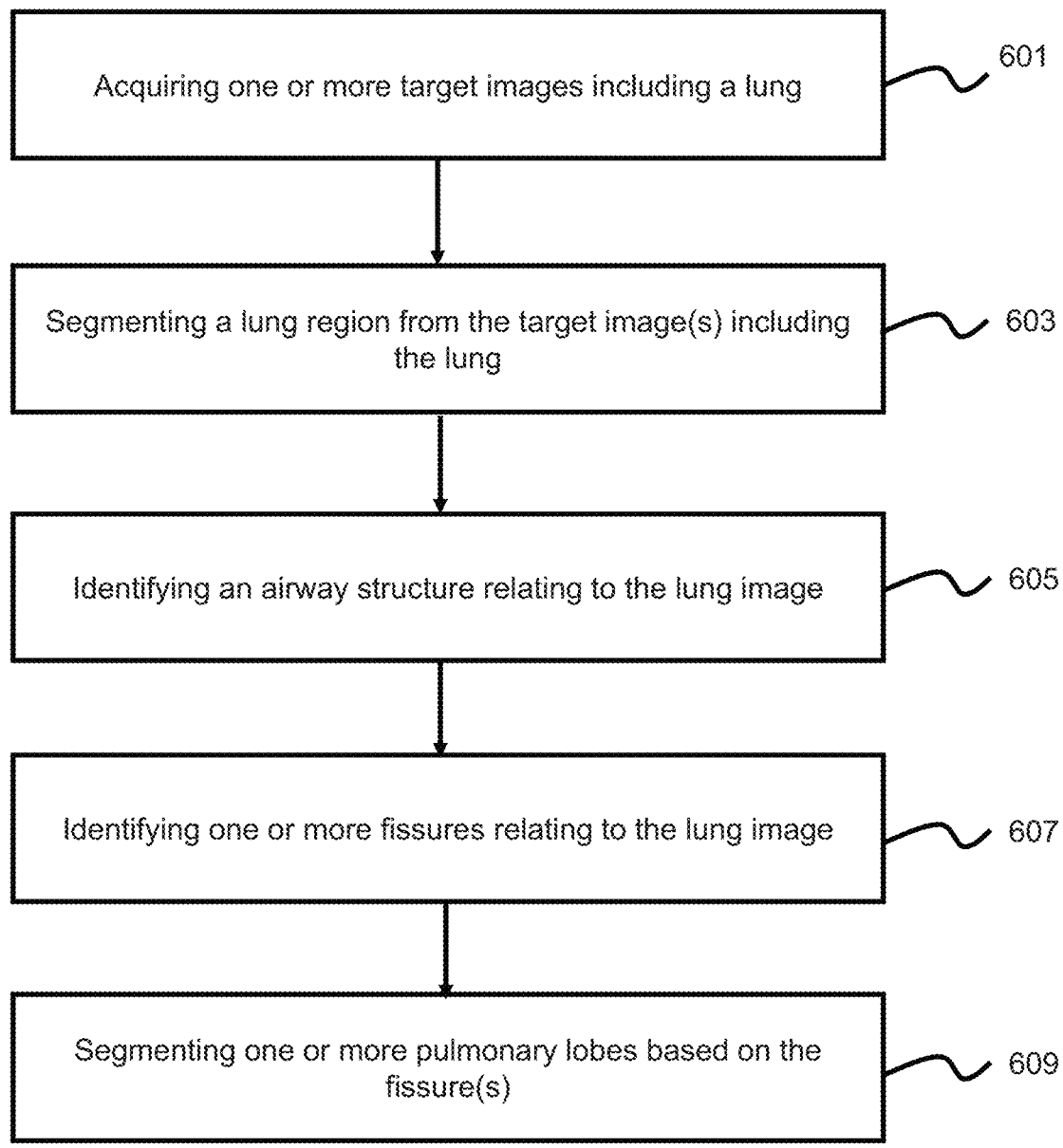
FIG. 6 is an exemplary flowchart illustrating a lung segmentation process according to some embodiments of the present application.

FIG. 6 is an exemplary flowchart illustrating a lung segmentation process according to some embodiments of the present application. In some embodiments, the process 600 for image segmentation may be related to 407 in the process 400.

In 601, one or more target images including a lung may be obtained. In some embodiments, 601 may be implemented by the lung segmentation module 510. The target image(s) may include an MRI image, a CT image, a PET image or any combination thereof. In some embodiments, an image segmentation, an image registration, a three-dimensional reconstruction, a structure analysis, a kinematic analysis, or other operation may be performed on the target image(s). The image segmentation may include an automatic segmentation, an interactive segmentation, and a manual segmentation, or the like. In some embodiments, the target image(s) may be obtained by scanning the scanned object. The scanned object may be a whole or a part of a scanned target. The scanned target may include a human body, an animal, a non-biometric object, or the like. The scanned object may include, for example, an organ, a tissue, a lesion site, a tumor site, or any combination thereof. In some embodiments, the target image(s) may be three-dimensional image(s). The target image(s) may be image slice(s) along a cross section. The cross section herein may refer to a section perpendicular to an axial direction of a human body.

In 603, a lung region may be segmented from the target image(s) including the lung. In some embodiments, 603 may be implemented by the lung segmentation module 510. The lung region may include a left lung region and a right lung region. In some embodiments, the segmentation may be performed by various techniques. The techniques may include a threshold technique, a clustering algorithm, a region growing technique, an image registration technique based on an image shape model, a watershed technique, a fuzzy C-mean algorithm, or the like. For example, the threshold technique may include an adaptive thresholding technique for lung segmentation and an optimal thresholding technique for lung segmentation. In some embodiments, the image may be segmented based on information of the image. The information of the image may include the grayscale, the gradient, the resolution along different directions, boundary information, intensity information of the image, or any combination thereof. In some embodiments, the segmentation of the lung region may be performed based on an airway of the lung, a blood vessel of the lung, or the like. In some embodiments, a characteristic slice of the lung may be determined, and the image information may be obtained based on the characteristic slice of the lung. Additionally, a starting slice of the lung and an end slice of the lung may be determined. The determination may be performed by constructing a function. The function may include a three-dimensional function and a two-dimensional function. In some embodiments, a determination may be made as to whether the lung region includes a left lung and a right lung simultaneously, and whether the left lung and the right lung are connected.

In 605, an airway structure relating to the lung image may be extracted. In some embodiments, 605 may be implemented by the airway identification module 520. In some embodiments, the lung image may be a three-dimensional image, and the airway structure may be a three-dimensional structure. The three-dimensional structure may include structures of the trachea, the left main bronchus, the right main bronchus, or the like. In some embodiments, the airway structure may be obtained based on different airway centerlines and connection relations of different airways. An airway centerline may include the trachea centerline, the left main bronchus centerline, the right main bronchus centerline, or the like. In some embodiments, the extraction of the airway structure may include pruning a false centerline bifurcation or a small lobe near the trunk of an airway tree. The false centerline or small lobe may include a centerline in which the number of pixels is smaller than a threshold. In some embodiments, the extraction of the airway structure may include identifying one or more centerlines in the airway tree. The identification may be implemented based on information of the airway tree. The information of the airway tree may include a node corresponding to an airway centerline, a cosine value between centerline points, a z-axis coordinate of a centerline, or the like. The coordinate may be an anatomical coordinate (also referred to as "patient coordinate system"). An x-axis may refer to a direction from the right to the left of a human body (e.g., a direction from a right lung to a left lung). The X-axis may be perpendicular to a sagittal plane. A y-axis may refer to a direction from the front to the rear of a human body. The y-axis may be perpendicular to a coronal plane. A z-axis may refer to a direction from feet to a head of a human body. The z-axis may be perpendicular to a cross section. In some embodiments, extracting the airway structure may include labeling the airways) corresponding to one or more identified airway centerlines. The labeling may include classifying the airway(s) corresponding to the one or more identified airway centerlines.

In 607, one or more fissures relating to the lung image may be segmented. In some embodiments, the operation 607 may be implemented by the fissure segmentation module 530. In some embodiments, the segmentation of the fissures may include identifying candidate fissures from a plurality of image slices relating to the lung image. The candidate fissures may be obtained by image enhancement. For example, the image enhancement may be performed based on a Hessian matrix. In some embodiments, the segmentation of the fissures may include performing a region growing on the candidate fissures. The region growing may be performed based on an Eigenvector of a fissure. The Eigenvector may be determined on a Hessian matrix. In some embodiments, the fissure segmentation may include merging the candidate fissures. Additionally, a fissure curved surface may be obtained by fitting the merged fissures. The merged fissures may include fissures in the same direction or different directions. The surface fitting may be performed based on a thin plate spline interpolation technique.

In 609, one or more pulmonary lobes may be segmented based on the fissures. In some embodiments, the operation 609 may be implemented by the pulmonary lobe segmentation module 540. In some embodiments, a lung image may be obtained. The image may include information of airways and fissures, or the like. In some embodiments, the segmentation of the pulmonary lobe(s) may include determining a shortest distance from a point in the image to an airway branch. The shortest distance may be determined based on a Dijkstra algorithm. The Dijkstra algorithm may determine the shortest distance based on one or more variants. The variants may include a branch point of an airway, labeling information of a point (e.g., a color label), fissure information (e.g., fissure information after an expansion), or the like. In some embodiments, a pulmonary lobe to which a point belongs may be determined based on the shortest distance from the point to the airway branch. In other embodiments, a region without a label in a pulmonary lobe may be labeled.

The above description of the lung segmentation process is merely an example and should not be considered as the only possible embodiment. It will be apparent to those skilled in the art that, after understanding the basic principle, it is possible to make modifications and changes in form and detail on the embodiments and operations without departing from the principle, but these modifications and changes are still within the scope of the above description. For example, one or more optional steps, such as, determining an airway centerline, an airway position, or the like, may be added between the operation 603 and the operation 605. As another example, the operation 609 may be not necessary. Those modifications do not depart from the scope of the present disclosure.

Figure 7:
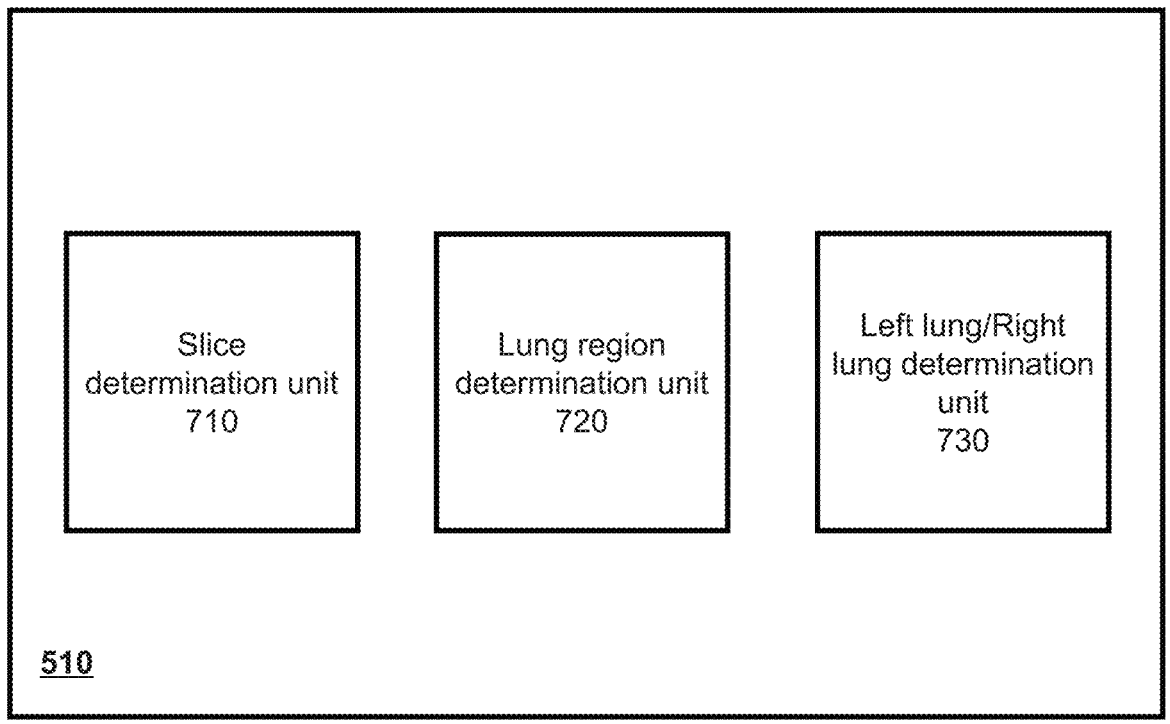
FIG. 7 is a schematic diagram illustrating a lung segmentation module according to some embodiments of the present application.

FIG. 7 is a schematic diagram of a lung segmentation module 510 according to some embodiments of the present application. As shown in FIG. 7, the lung segmentation module 510 may include a slice determination unit 710, a lung region determination unit 720, and a left lung/right lung determination unit 730.

The slice determination unit 710 may obtain and analyze an image slice. The image slice may be an MRI image, a CT image, a PET image, or any combination thereof. In some embodiments, the image slice may be obtained by scanning the scanned object. The analysis of the image slice may include identifying slice information, determining a region to which a slice belongs, determining a characteristic slice, determining a starting slice or an end slice, or the like. The slice information may include a size, a shape, and a position of the scanned object in the slice, or the like. For example, the slice determination unit 710 may identify a size, a shape, and a position of a lung in an image slice relating to the lung. The region to which the slice belongs may be a region (e.g., a lung, a top of head, or the like) to which the image slice belongs in the scanned object. For example, the slice determination unit 710 may determine whether an image slice belongs to a lung based on a maximum value of a lung contour along a horizontal direction and a vertical direction in an image. The characteristic slice may be a slice with a largest cross-sectional area of the scanned object in a plurality of image slices of the same scanned object. For example, taking CT image slices of the lung region as an example, the slice determination unit 710 may determine a lung characteristic slice based on a distribution of CT values of the image shoes. The lung characteristic slice may be a shoe with a largest cross-sectional area of a lung in the image slices. The starting shoe may be a starting shoe of a target region to be segmented, and the end shoe may be an end shoe of a target region to be segmented. For example, the shoe determination unit 710 may determine a starting shoe and an end shoe of a lung region. In some embodiments, the shoe determination unit 710 may determine a starting slice and an end shoe of the lung region based on a lung characteristic slice. The starting slice and the end shoe may be respectively located at certain distance(s) from two sides of the characteristic shoe. Detailed description about the analysis of the image shoes (e.g., a determination of a region to which the image shoe belongs, a determination of a characteristic shoe) may be found elsewhere of the present application (e.g., FIG. 8 and the description thereof).

The lung region determination unit 720 may determine a contour of a lung region. In some embodiments, the contour of the lung region may be determined based on the starting shoe and the end shoe of the lung region. For example, a starting shoe and an end shoe of a lung region, and shoes between the starting shoe and the end shoe may form a shoe set corresponding to the lung region. The lung region determination unit 720 may perform image preprocessing on the shoe set corresponding to the lung region, for example, performing smoothing or denoising on the included image slices. Further, an energy function and the contour of the lung may be determined based on preprocessed image shoes. Detailed description about determining the lung region may be found elsewhere of the present application (e.g., FIG. 8 and the description thereof).

The left lung/right lung determination unit 730 may determine the left lung and the right lung in the lung region. In some embodiments, the left lung/right lung determination unit 730 may determine the left lung and the right lung based on a region growing technique. The region growing technique may include selecting a seed point of a target region (e.g., a left lung seed point, a right lung seed point, or the like), and merging neighboring pixel(s) having an attribute similar to that of the seed point into the same region. The region growing technique may be used to obtain the left lung, the right lung, or obtain the left lung and the right lung simultaneously. Furthermore, the left lung/right lung determination unit 730 may further determine whether the region obtained by the region growing technique is the left lung, the right lung, or the left lung and the right lung. Detailed description about determining the left lung and/or the right lung may be found elsewhere of the present application (e.g., FIG. 8 and the description thereof).

It should be noted that the description of the lung segmentation module is merely provided for convenience of description, and the embodiments are not intended to limit the scope of the present application. It would be understood for those skilled in the art, after understanding the principle of the system, various modules may be modified and/or mended without departing from the principle. For example, a storage unit for storing intermediate data or a processing result generated by a module may be added in the module of the lung segmentation module 510. As another example, one or more modules may be integrated into one module to implement functions thereof.

Figure 8:
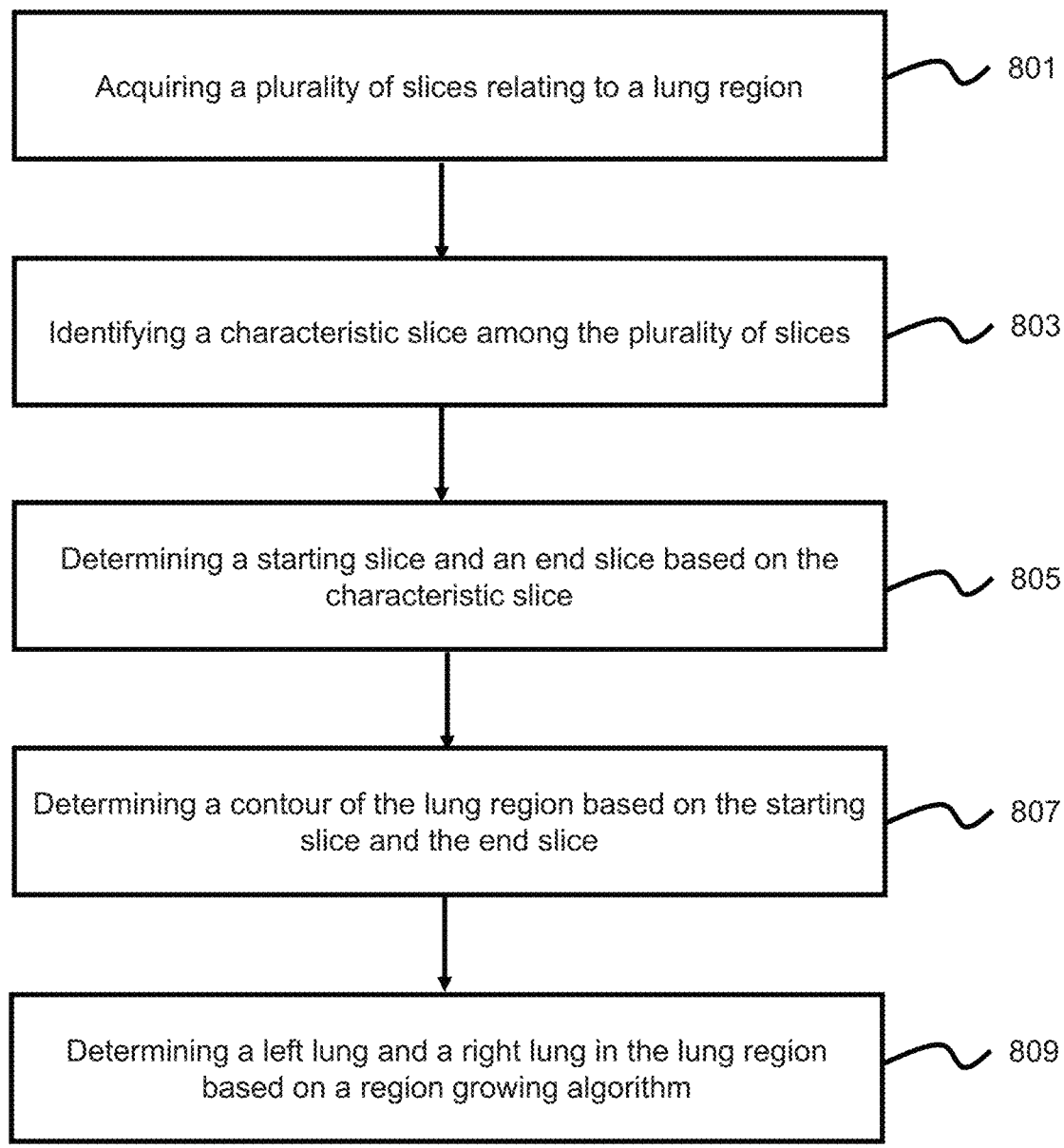
FIG. 8 is an exemplary flowchart illustrating a lung segmentation process according to some embodiments of the present application.

FIG. 8 is an exemplary flowchart illustrating a lung segmentation process according to some embodiments of the present application. In some embodiments, the lung segmentation may be implemented by the lung segmentation module 510. In some embodiments, the process 800 of the image segmentation may be related to 405 in the process 400.

In 801, a plurality of image slices relating to a lung region may be obtained. In some embodiments, 801 may be implemented by the slice determination unit 710. The image slice may include an MRI image, a CT image, a PET image or any combination thereof. In some embodiments, the image slice(s) may be obtained by scanning the scanned object. Taking a CT image as an example, a CT image slice may include a plurality of two-dimensional image slices. The image slices may refer to N images arranged in an order (e.g., from a head to feet), The N may be any positive integer. The N may be a default parameter of the system, or be set by a user (e.g., a doctor or a nurse). In some embodiments, different scanned objects (e.g., different patients) may correspond to values of the N. For example, according to physiological information (such as, height and weight) of the scanned object, the imaging system 100 may determine a required scan range, so as to determine the value of the N. In some embodiments, any one of N image slices may be selected and slice information may be identified. The slice information may include a size, a shape, a position, or the like of the scanned object in the image slice. In some embodiments, a region of the scanned object to which the image slice belongs may be determined based on the slice information. For example, a determination may be made as to whether the image slice belongs to a lung, a vertex, a half head, or a skull base, or the like based on a size and/or shape of the scanned object in an image slice. For example, maximum values of a contour (e.g., a lung contour) along a horizontal direction and a vertical direction in the image may be determined. The maximum value in the vertical direction may be compared with a preset threshold, and a position to which an image slice belongs may be identified. In some embodiments, one or more preset thresholds may be set. For example, a first threshold a1 and a second threshold a2 in the vertical direction may be set. If a maximum value in the vertical direction is between the threshold a1 and the threshold a2, it may be determined the image slice belongs to the lung. The threshold may be a default parameter of the system or be set by a user.

In 803, a characteristic slice (also referred to as "lung typical slice") may be determined among the image slices. In some embodiments, 803 may be implemented by the slice determination unit 710. The characteristic slice may be a slice with a largest cross-sectional area of a lung among the image slices. In some embodiments, the characteristic slice may be determined based on a distribution of CT values of a lung region in difference image slices. For example, a characteristic slice may be determined based on a histogram of CT values within a threshold range in different image slices. The threshold range may be a default setting of the system or be set by a user. In some embodiments, a characteristic slice may be determined by constructing a function. The function may be obtained based on image characteristics. Exemplary image characteristics may include a grayscale, a gradient value, an enhanced value, a shape, or the like, or any combination thereof. For illustrative purpose, a function may be expressed as follows:

$$H(z,v) < num\{(x,y,z) \in I | V_{low} < I(x,y,z) < V_{high}\} \quad (1)$$

wherein, H(z,v) represents the number of points whose CT values are in an image slice z, I represents a set of CT values in an image, x and y represent a position of a point in the image, $V_{low}$ and $V_{high}$ respectively represent a minimum threshold and a maximum threshold of a CT value. The point herein may correspond to a minimum unit (e.g., a pixel or a voxel) in an image slice. Equation (1) may be used to count the number of points within a CT value range in an image slice. Since a lung includes a large region with CT value(s) less than those of the tissues surrounding the lung, relatively low threshold $V_{low}$ and threshold $V_{high}$ may be set respectively, so as to determine a distribution of CT values of a lung region in each slice. For example, thresholds $V_{low}$ and $V_{high}$ of a CT value may be respectively set as −944 HU and −300 HU, so that a distribution of CT values within the threshold range may be obtained.

In some embodiments, based on the H(z,v), a distribution of CT values within the threshold range may be determined for the image slice z. The distribution of the CT values may be expressed in the form of a histogram or a fitting curve. For example, the distribution of the CT values in the image slice z may be expressed as a histogram. The highest point in the histogram may represent the maximum number of points in the image slice z that have the same CT value. As another example, the distribution of the CT values in the image slice z may be expressed as a curve. The curve may be obtained in the manner of, for example, two-dimensional Gaussian smoothing or histogram fitting. The highest point in the fitting curve may represent the maximum number of points in the image slice z that have the same CT value. As another example, a filtering and denoising may be performed on the distribution of the CT value. The filtering may be performed based on a normalization block filtering technique, a Gaussian filtering technique, a median filtering technique, a bilateral filtering technique, or the like. Additionally, the maximum numbers of points having the same CT value in difference image slices may be compared to determine the image slice that have the maximum value of the maximum number, and the image slice may be determined as a characteristic slice. For example, the maximum value of H(z,v) may correspond to (zp, vp), which means that among all image slices, the number of points whose CT values are vp in the image slice zp may be maximum. The image slice zp may be designated as a characteristic slice, i.e., a lung typical slice.

In some embodiments, based on the H(z,v), the total number of points whose CT values are within the threshold range in the image slice z may be determined. The total number may correspond to a size of a lung region in the image slice z. Additionally, an image slice having the maximum total number of points may be determined by comparing the total number of points in different image slices z. Similarly, the image slice having the maximum total number of point may be designated as a characteristic slice, i.e., a lung typical slice.

Figure 15:
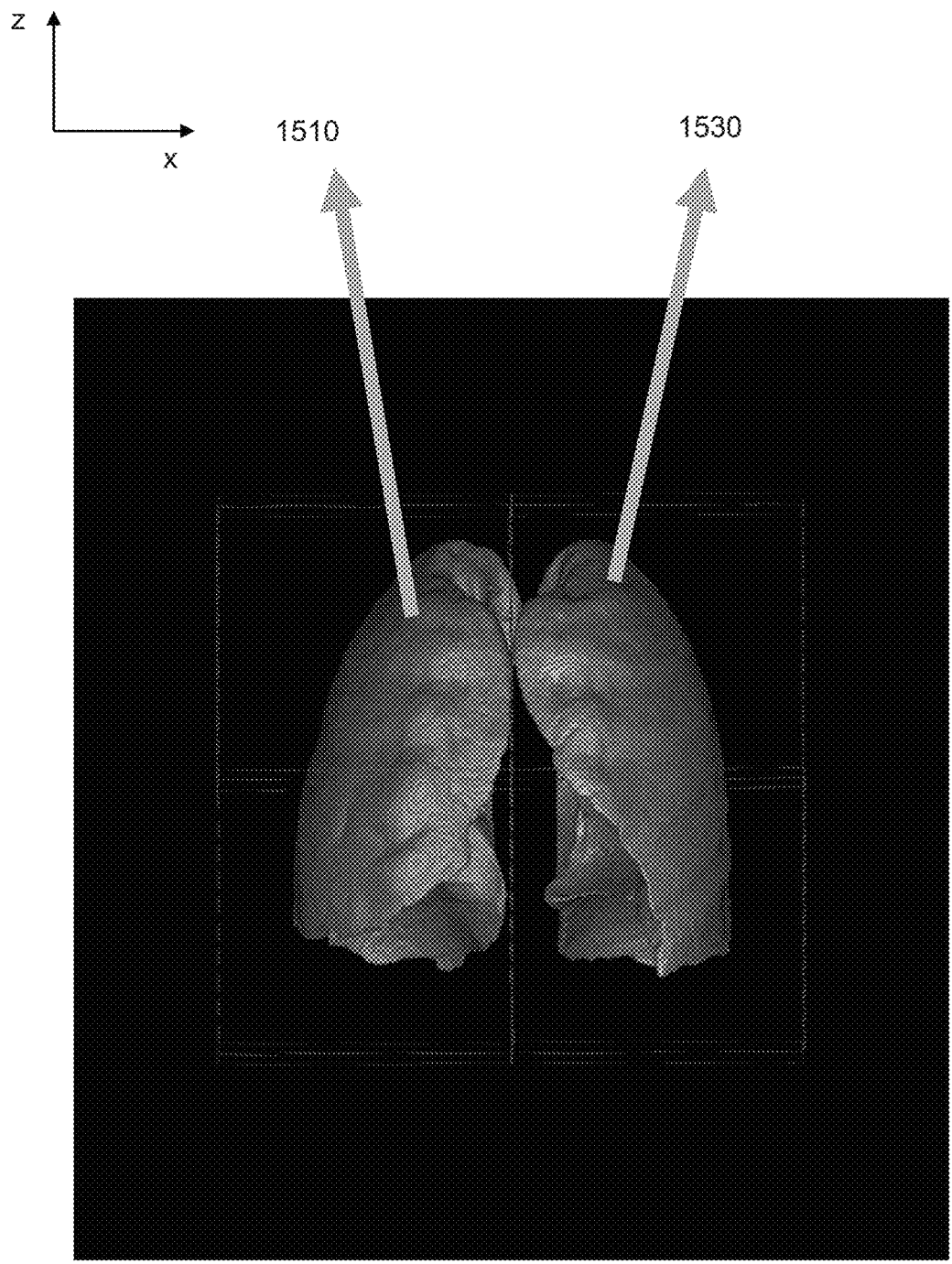
FIG. 15 is a schematic diagram illustrating a result of lung region segmentation according to some embodiments of the present application.

In 805, a starting slice (also referred to as "lung starting slice") and an end slice (also referred to as "lung end slice") may be determined based on the characteristic slice. In some embodiments, 805 may be implemented by the slice determination unit 710. The starting slice and the end slice may be respectively located at certain distance(s) from two sides of the characteristic slice. For illustration purposes, the positions of the starting slice and the end slice may be determined by Equation (2):

$$Lbegin = Lfeature + \beta \times add$$

$$Lend = Lfeature - \beta \times add \quad (2)$$

wherein Lfeature represents the characteristic slice, add is a reference value of the height of the lung, and β is a range coefficient of the height of the liver. In some embodiments, add may be related to a size of the liver and a resolution of the CT scan sequence. For example, add may be set as $z_p/f_{SpaceZ}$ ($z_p$ is an image slice corresponding to a characteristic slice and $f_{SpaceZ}$ is a resolution of the CT scan sequence along a z-axis). In some embodiments, a value range of β may be [1.5, 2]. In some embodiments, an image slice set of the lung region may be determined based on the starting slice, the end slice, and the image slices between the starting slice and the end slice. A subsequent lung segmentation may be performed based on the image slice set of the lung region. Before the lung segmentation, an interpolation or the like may be performed on the image slice set of the lung region. In some embodiments, the interpolation may include an inverse distance weighed interpolation, a Kriging interpolation, a minimum curvature and natural neighbor interpolation, a nearest neighboring point interpolation, a multi factor regression interpolation, and a triangulation with linear interpolation, or the like. In some embodiments, the interpolation may include an isotropic interpolation. The resolutions in x, y and z directions may be adjusted and the image may be zoomed in different directions. Specifically, the isotropic interpolation may include determining a zooming proportion in each of the x, y and z directions based on the respective resolutions in the direction. A new dimension for each direction after image zooming may be determined based on the corresponding zooming proportion, and linear interpolations in the x, y and z directions may be determined based on the new dimensions. In some embodiments, the CT value of a point with a CT value greater than a preset threshold in the image slice set of the lung region may be reassigned, for example, to 0. The preset threshold may be a maximum CT value of points in the lung region in medical imaging. The points whose CT values greater than the preset threshold may be considered as points in other tissues or regions other than a lung. The points with a CT value of 0 may not be taken into account in the sequent processing, so as to reduce a computing effort. As shown in FIG. 15, a z-axis may refer to a direction of scanned slices, i.e., a direction from feet to a head of a scanned object. An x-axis may refer to a direction from a right lung to a left lung. A y-axis may be perpendicular to a plane formed by the x-axis and the y-axis.

In 807, a contour of the lung region may be determined based on the starting slice and the end slice. In some embodiments, 807 may be implemented by the lung region determination module 720. In some embodiments, the starting slice and the end slice of the lung region, and image slices between the starting slice and the end slice may form an image slice set of the lung region. The contour of the lung region may be determined based on the image slice set of the lung region. Before determining the contour of the lung region, the image slice set of the lung region may be preprocessed. The preprocessing may include an imaging smoothing or an image denoising. For example, an image filtering and an image denoising may be performed on the image slices. The image filtering and the image denoising may be performed based on a normalization block filtering technique, a Gaussian filtering technique, a median filtering technique, a bilateral filtering technique, or the like. As another example; a Gaussian smoothing may be performed on the image slices.

An energy function may be constructed and the contour of the lung may be determined based on image information (e.g., boundary information and intensity information) of images in the image slice set of the lung region or the corresponding preprocessed images. In some embodiments, the energy function may be constructed based on a model. The model may include an edge-based active contour model, a region-based active contour model, or any combination thereof. In some embodiments, the energy function may be constructed based on the image information. The image information of an image may include gradient information, boundary information, pixel grayscale information; background information; average grayscale information, energy distribution, a size of the images, or the like. In some embodiments, points with the minimum energy may be obtained based on a motion of an active contour curve. The points with the minimum energy may include a series of points and form a level set function U. A value of the level set function U may represent brightness of pixels or voxels in the image, and the brightest portion in the image may be selected as the lung region.

As an example; by constructing the energy function, the minimum value of the energy function may drive the active contour curve to approach an edge of the lung gradually, and a more accurate lung region may be segmented finally. For illustration purposes, an energy function may be represented by Equation (3):

$$E_{gmac}(u=1_{\Omega_C}c1,c2,\lambda)=\int_C g(x)|\nabla u|dx+\lambda\int_{\Omega_C}(s1(x)-f(x))^2 dx+\lambda\int_{\Omega\backslash\Omega_C}(s2(x)-f(x))^2 dx \qquad (3)$$

wherein f represents a function of an image to be segmented, Ω represents an image domain set, $\Omega_C$ may be a subset of Ω, and represents an interior surrounded by a curve C, S1 represents a probability that a point x occurs in a contour of the lung region, 32 represents a probability that a point x occurs at the outside of the contour, g(i) represents an edge investigation function, u is a functional and represents a segmented boundary curve, c1 represents an interior characteristic of the portion of the image inside the contour, c2 represents an exterior characteristic of a portion of the image outside the contour, and λ represents a weight parameter. In some embodiments, the edge investigation function g(i) may be inversely proportional to a gradient of an image at x, and may be represented by the following Equation;

$$g(i)=1/(1+Beta*NormGrad[i]*NormGrad[i]) \qquad (4)$$

wherein i represents each pixel or voxel in a data set, NormGrad [i] represents a modulus of the gradient of the pixel or voxel in the x-direction, wherein the parameter Beta may be represented as $$Beta=fBetaParm/(iMaxIm*iMaxIm) \qquad (5)$$

wherein iMaxIm represents a difference value between a maximum value and a minimum value of CT values. As an example, the maximum value of CT values may be set as −300 HU and the minimum value may be set as −944 HU. The iMaxIm may equal to 644. The fBetaParm value may be manually set as, for example, 2000.

In 809, a left lung and a right lung in the lung region may be determined based on a region growing technique. In some embodiments, 809 may be implemented by the left lung/right lung determination unit 730. In some embodiments, the region growing technique may expand a region including a plurality of pixels to a larger region. For example, based on a set of seed points, neighboring pixel(s) with similar attribute(s) to each seed point may be merged into the same region. The attribute(s) may include an intensity, a grayscale, a texture color of the seed point, or the like. In some embodiments, candidate seed point(s) of the left lung and the right lung may be determined, and seed point(s) may be selected accordingly. In some embodiments, the determining seed point(s) of the left lung and the right lung may include: in the data set (e.g., the image slice set of the lung region determined by the starting slice and end slice), determining a point meeting a certain condition with respect to the level set function, for example, a point with the level set function U greater than fThreU. The fThreU may be a minimum value of the level set function U of all points of the lung region. In some embodiments, fThreU may be a value set by a user, for example, 0.005, 0.01, 0.015, or any other values in the range of 0.005 to 0.015. The point meeting the condition may include a point having a minimum x-coordinate minX, a point having a maximum x-coordinate maxX, a point having a minimum y-coordinate minY, a point having a maximum y-coordinate maxY, a point having a minimum z-coordinate minZ, and a point having a maximum z-coordinate maxZ. Based on positions of the left lung and the right lung in a lung cavity, the candidate seed point of the left lung may include (minX+0.25×(maxX−minX), (minY+maxY)/2, and (minZ+maxZ)/2). The candidate seed point of the right lung may include (minX+0.75×(maxX−minX), (minY+maxY)/2, and ((minZ−FmaxZ)/2). Additionally, the seed point(s) may be determined based on the candidate seed point(s) of the left lung/right lung. For example, the seed point(s) may be point(s) within a certain range around a candidate seed points and have a maximum value of the level set function U. For example, the range around a candidate seed point may include a cube including 10×10×10 pixels centered at the candidate seed point. A region growing may be performed based on the seed point(s), and points in the growing region (i.e., U>fThreU) may be labeled. In the region growing process, each seed point may be grown until each pixel in the data set is processed. In some embodiments, the growing region may be the left lung or the right lung, or include both the left lung and the right lung.

In some embodiments, the region obtained by the region growing may be the left lung, the right lung, or both the left lung and the right lung. The left lung/right lung determination unit 530 may further determine whether both of the left lung and the right lung are segmented. If one of the left lung and the right lung is segmented, the other lung may be obtained by the same region growing technique. If both of the left lung and the right lung are segmented, a determination as to whether the left lung and the right lung are connected may be made. If the left lung and the right lung are connected, the left lung and the right lung may be further distinguished. If the left lung and the right lung are not connected, a reverse interpolation processing may be performed on the data set (e.g., the image slice set of the lung region determined by the starting slice and the end slice), so as to restore the size of the image slices to the original size. In some embodiments, the determining whether the left lung and the right lung are connected may include obtaining a maximum x-coordinate and a minimum x-coordinate of all points in the growing region. If the maximum x-coordinate exceeds 0.75 times an x-axis region, or the minimum x-coordinate is less than 0.25 times the x-axis region, the left lung and the right lung are connected, otherwise only one of the left lung and the right lung is segmented. The multiples (0.75, 0.25) are provided for convenience of description, and are not intended to limit the scope of the present disclosure. Any other multiple may be adopted. In some embodiments, the distinguishing the left lung and the right lung may include breaking the connection between the left lung and the right lung in the segmented lung region based on a morphology algorithm, and storing eroded points (e.g., lost points at the broken position) by using an array. The distinguishing the left lung and the right lung may also include determining shortest distances from a point in the array to the left lung and the right lung respectively. If the shortest distance for the point to the left lung is smaller than that to the right lung, the point may be designated to the left lung, otherwise the point may be designated to the right lung.

The above description of the lung region segmentation process is only a specific example and should not be considered as the only possible embodiment. It will be apparent to those skilled in the art that, after understanding the basic principle, it is possible to make modifications and changes in form and detail on the specific embodiments and operations without departing from the principle, but these modifications and changes are still within the scope of the above description. As an example, one or more optional operations, for example, constructing a function, or the like, may be added between the operation 803 and the operation 805.

Figure 9:
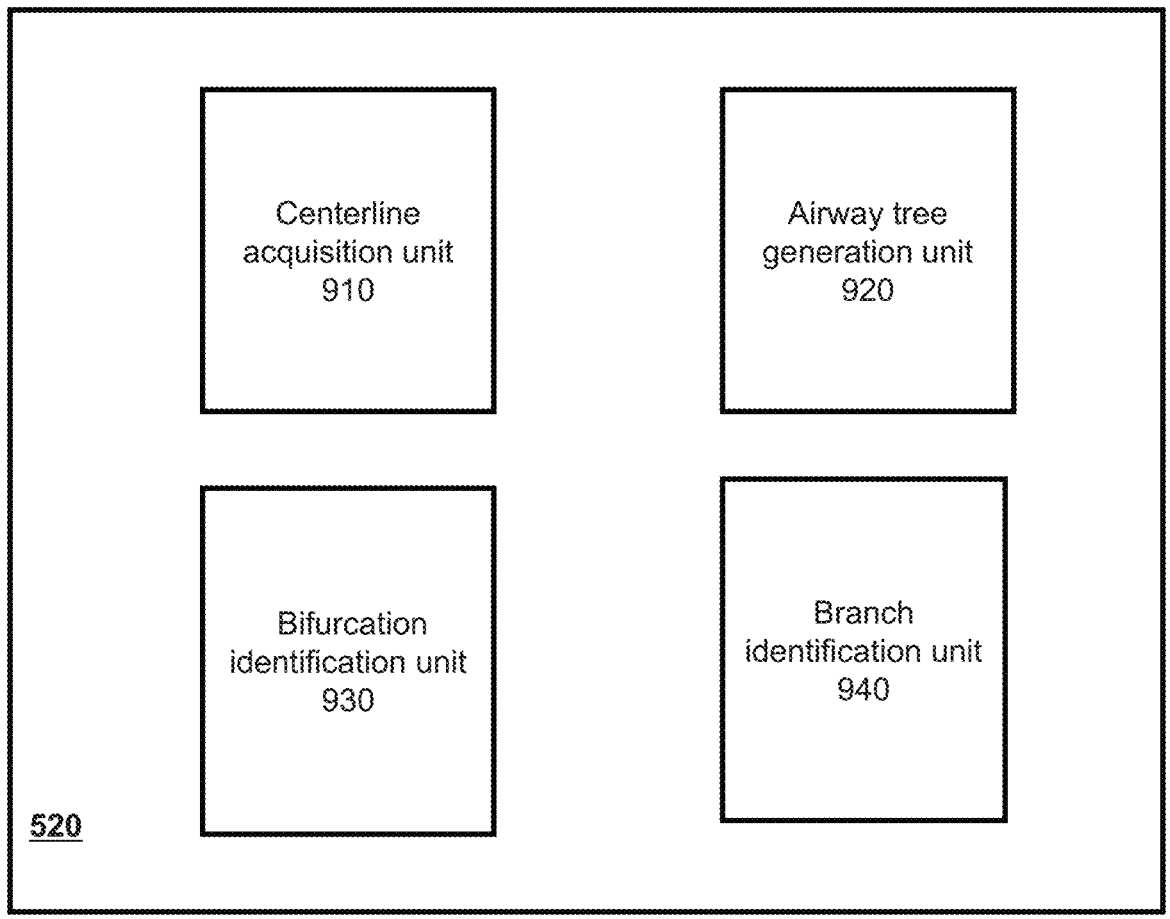
FIG. 9 is a schematic diagram illustrating an airway identification module according to some embodiments of the present application.

FIG. 9 is a schematic diagram of the airway identification module 520 according to some embodiments of the present application. As shown in FIG. 9, the airway identification module 520 may include a centerline acquisition unit 910, an airway tree generation unit 920, a bifurcation identification unit 930, and a branch identification unit 940.

The centerline acquisition unit 910 may acquire an airway centerline. In some embodiments, the airway centerline may be an imaginary line along the airway. The airway centerline may include a set of one or more pixels (or voxels) within the airway. In some embodiments, the airway centerline may include a set of pixels (or voxels) in the airway center or near the airway center or a line composed of pixels (or voxels) in the airway center or near the airway center. The airway centerline may include one or more airway endpoints (e.g., a starting point or an end point in the airway). In some embodiments, the airway may include one or more centerlines. For example, the airway centerline may be obtained by connecting a starting point, a path point and an end point of an airway. In some embodiments, the centerline may be obtained by a plurality of techniques. The techniques may include a technique based on topological thinning, a technique based on distance transform, a technique based on path planning, a technique based on tracing, and a technique based on a shortest path, or the like. Different branches of the airway (e.g., different branch airways) may correspond to different centerlines respectively. The airway centerline may include one or more starting points. The one or more starting points may be respectively located at endpoints of different branch airways. For example, a starting point of the airway centerline may be located at an endpoint of the trachea, or the left main bronchus, the right main bronchus or other bronchi.

The airway tree generation unit 920 may generate an airway tree corresponding to an airway structure. The airway tree may include branches corresponding to the trachea, the left main bronchus, the right main bronchus, or the like. The airway tree generation unit 920 may start from a starting point of an airway centerline (e.g., from an endpoint of the trachea) to an endpoint of the airway branch (e.g., to endpoint of the left lung upper lobe bronchus, the right lung lower lobe bronchus, or the like) along one or more centerlines of branch airways to generate a tree structure. In some embodiments, the airway tree generation unit 920 may generate the airway tree by the simulation with a programming language or software. The programming language may include c++, Java, pascal, net, vb, C language and assembling, or the like.

The bifurcation identification unit 930 may identify a false centerline bifurcation or a small lobe. The false centerline bifurcation or small lobe may include a centerline in which the number of pixels between two endpoints of the centerline is less than a certain threshold. In some embodiments, identifying one or more centerlines in the airway tree may include identifying nodes corresponding to the centerlines of the airway. The nodes corresponding to the centerlines of the airway may include nodes corresponding to centerlines of the trachea, the left main bronchus, the right main bronchus, or the like. In some embodiments, the bifurcation identification unit 930 may label the identified false centerline bifurcation or small lobe.

The branch identification unit 940 may identify different branch airways in the airway, or centerlines corresponding to different branch airways in the airway tree. In some embodiments, the branch identification unit 940 may label the identified branch airways or one or more centerlines in the airway tree. For example, the labeling may include labeling different branch airways with different colors.

It should be noted that the description of the airway identifying module is merely provided for convenience of description, and the embodiments are not intended to limit the scope of the present application. It would be understood for those skilled in the art that after understanding the principle of the system, various module may be combined, the connection between a subsystem and the other modules may be constituted without departing from this principle. For example, one or more modules may be integrated in one module to implement functions of the one or more modules.

FIG. 10-A is an exemplary flowchart illustrating an airway identification process according to some embodiments of the present application. In some embodiments, the process 1000 may be implemented by the airway identification module 520.

In 1001, an image of a lung region may be obtained. The image may include an airway structure. In some embodiments, the image of the lung region may be a three-dimensional image, and the airway structure may be a three-dimensional structure. The image of the lung region may include a plurality of image slices. The image slices may be related to the image slices of the operation 801 in the process 800.

In 1003, a reference point of the airway structure may be obtained. The reference point of the airway structure may be located on the airway centerline. Further, the reference point may be a starting point of the airway centerline. In some embodiments, the operation 1003 may be implemented by the centerline acquisition unit 910. The reference point may be extracted automatically, semi-automatically, or manually.

In 1005, an airway tree corresponding to the airway structure may be generated based on the reference point. In some embodiments, the operation 1005 may be implemented by the airway tree generation unit 920. The generation of the airway tree may include forming a tree structure from the reference point to end points of different branch airways in the airway structure respectively. In some embodiments, the airway tree may include centerlines corresponding to branch airways, such as the left main bronchus, the right main bronchus, respectively. The airway tree may be generated based on the centerlines of different branch airways, and the relationships among different branch airways.

For illustrative purpose, the process of generating an airway tree may be shown in FIG. 10-B. In 1015, a two-dimensional array allocated based on the length of centerlines may be obtained. For example, based on the length of each centerline and the longest centerline in the airway structure, each centerline may be allocated in a two-dimensional array. The number of rows of the array may be the addition of the number of pixels of the longest centerline and one, and the number of columns of the array may be the number of the centerlines. In 1017, the centerlines may be stored in the two-dimensional array. For example, each centerline may be traversed in turn, and the jth point of the ith centerline may be stored in the jth row of the ith column of the array. The portion not belonging to the centerline in each column may be assigned with −1, and the number of index values greater than the index value of the starting point may be counted in each centerline. If the counted number is greater than a certain percentage (such as, 80%) of the number of points in the centerline, the centerline may be deleted. The index value herein may represent a position of the centerline, and the larger the index value is, the closer the centerline is to the head portion. That an index value is greater than the index value of the starting point may represent that a centerline grows upward, indicating that the centerline is not a bronchial tree and the centerline shall be deleted. In 1019, nodes may be generated based on the two-dimensional array. A node herein may represent a segment of airway centerline (e.g., the branch airway centerline). Node information may include a unique number ID of the node, a name and an endpoint position of the segment of centerline, all points of the segment of the centerline, a parent node, a neighboring sibling node, and all child nodes of the current node. For an airway tree, a plurality of nodes may be dropped from a node, and a plurality of nodes may be dropped from each dropped node again. Each node and nodes dropped therefrom may represent a parent-child relation, and the nodes dropped therefrom may be child nodes of the node. The initial node from which the dropping begins may be a root node. Child nodes of one parent node may be sibling nodes mutually, and the sibling nodes may be stored in a certain order. For example, when stored, a node in front is an elder brother node of a node in back, and the node in back is a younger brother node. Further, the node information may include the number of all subordinate descendant nodes, the number and a mean value of subordinate leaf nodes, or the like.

In some embodiments, an airway tree may be recursively generated starting from a starting point of the centerline (i.e., an endpoint of the trachea centerline) corresponding to the root node (i.e., a first generated node) based on the generated nodes.

For example, the process for recursively generating the airway tree may be shown in FIG. 10-C. In 1021, a temporary node may be generated. The generation of the temporary node includes setting a parent node of the temporary node. In 1023, it may be determined whether there is a bifurcation based on the temporary node. From a current point the points i+1, i+2 . . . may be sequentially determined. When determining the jth point, a Euclidean distance between the jth point and another jth point in another centerline in the current centerline array (hereinafter referred to as "current Euclidean distance") may be determined. The current Euclidean distance may correspond to an actual distance between points. In some embodiments, the determination of whether there is a bifurcation may be performed according to a first threshold and a second threshold. For example, if the Euclidean distance is not larger than the first threshold (e.g., the first threshold may be set as 5), the process may proceed to the (j+1)th point until to the endpoint, and all nodes from the point i to the endpoint of the centerline may be stored in the temporary node, and the endpoint of the centerline may be taken as an endpoint of the temporary node. The temporary node may be set as a child node of the parent node. If the Euclidean distance is larger than the first threshold, it is assumed that a branch point may occur at the (j−1)th point. In the condition that there is a branch point, the current centerline array may be divided into two groups according to the determination that whether the Euclidean distance is larger than the second threshold (e.g., the second threshold may be set to 2.5). Points from the ith point to the (j−1)th point may be stored in the generated temporary node, and the (j−1)th point may be taken as the endpoint of the temporary node. The endpoint of the node herein may correspond to a starting point and an end point of an airway or a point of the airway connected with another airway. The temporary node may be set to be a child node of the parent node. In 1025, an airway tree may be generated based on the determination information. The process of generating the airway tree may include recursively generating trees on the two groups of centerlines divided in 1023 from the jth point as a starting node based on 1021 and 1023 until all points are processed.

Returning to FIG. 10-A, in 1007, it may be determined whether there is a false centerline bifurcation or small lobe near the trunk of the generated airway tree. In some embodiments, the determination may be implemented by the bifurcation identification unit 930. The false centerline bifurcation or small lobe may be a centerline in which the number of pixels between two endpoints is smaller than a certain threshold. If there is the false centerline bifurcation or small lobe, the process 1000 may proceed to the operation 1009. If there is no false centerline bifurcation or small lobe, the process 1000 may proceed to the operation 1011.

In 1009, the false centerline bifurcation and small lobe in the airway tree may be pruned. In some embodiments, the operation 1009 may be implemented by the bifurcation identification unit 930.

In 1011, one or more centerlines in the airway tree may be identified. In some embodiments, the operation 1011 may be implemented by the branch identification unit 940. The identification of the centerlines of the airway tree may include identifying nodes corresponding to centerlines of different branch airways, for example, nodes corresponding to centerlines of the trachea, the left main bronchus, and the right main bronchus. An exemplary process of identifying the centerlines of the airway tree may be shown in FIG. 10-D. In 1027, the nodes corresponding to the centerlines of the trachea, the left main bronchus, and the right main bronchus may be identified. In 1029, the nodes corresponding to centerlines of the left upper lobe bronchus and the left lower lobe bronchus may be identified. In 1031, the nodes corresponding to centerlines of the right upper lobe bronchus, the right middle lobe bronchus, and the right lower lobe bronchus may be identified.

In some embodiments, the process of searching for nodes corresponding to the centerlines of the trachea, the left main bronchus, and the right main bronchus may be shown in FIG. 10-E. In 1033, a starting point of the trachea centerline may be chosen. For example, a first child node of the root node may be taken as the node corresponding to the trachea centerline. In 1035, a condition of the child node of the trachea centerline may be determined. The determination may include the following two conditions: there is no child node; and there are two or more child nodes, but the child nodes have no child node. In 1037, it may be determined whether there is a false small branch based on the condition of the child node of the centerline. In the condition that there are two or more child nodes in the node corresponding to the trachea centerline, and the child nodes have no further child node, if the number of centerlines in a certain child node of the trachea centerline is very small (e.g., the number of pixels between two endpoints of the centerline of the node is less than 20), there may be a false small branch. Then, the operation 1033 may be performed again so as to choose the node corresponding to the trachea centerline. For example, the node having the most centerlines in its child nodes is taken as the node corresponding to the trachea centerline; if there is no false small branch, the operation 1039 may be performed and the node corresponding the left main bronchus centerline and the node corresponding to the right main bronchus centerline may be labeled based on the node corresponding to the trachea centerline. For example, the endpoint x-coordinates (e.g., coordinates along a direction from the right lung to the left lung) of the child nodes of the trachea may be determined, and the child node having a larger value of x-coordinate is taken as the node corresponding to the left main bronchus centerline and the child node having a smaller value of x-coordinate is taken as the node corresponding to the right main bronchus centerline. The node corresponding to the trachea centerline, the node corresponding to the left main bronchus centerline, and the node corresponding to the right main bronchus centerline that have been identified may be labeled (e.g., the nodes may be labeled as Trachea, LMB, and RMB, respectively).

In some embodiments, the exemplary process of searching for a node corresponding to the centerlines of the left upper lobe bronchus or the left lower lobe bronchus may be shown in FIG. 10-F. In 1041, the number of child nodes of the left main bronchus may be determined. In 1043, it may be determined whether there is a child node. If the number of the child node is 0, the process may proceed to the operation 1053. If the number of the child node is not 0 (e.g., the number of the child node is equal to or larger than 2), the process may proceed to the operation 1045. In 1045, an endpoint of each child node and an endpoint of the left main bronchus centerline may be mapped so as to form a vector directed from the endpoint of the left main bronchus centerline to the endpoint of the child node, and the vector may be further normalized. In 1047, the node corresponding to the left upper lobe bronchus centerline and the node corresponding to the left lower lobe bronchus centerline may be identified based on the mapped vector. In the condition that the number of the child nodes is more than 2, z-coordinates (i.e., coordinates along a slice direction) of the normalized vectors may be determined. The child node corresponding to the maximum z-coordinate may be the node corresponding to the left upper lobe bronchus centerline and the child node corresponding to the minimum z-coordinate may be the node corresponding to the left lower lobe bronchus centerline. Among the child nodes of the left main bronchus, nodes which are not the nodes corresponding to the left upper lobe bronchus centerline or the left lower lobe bronchus centerline may be merged into the nodes corresponding to the left upper lobe bronchus centerline or the left lower lobe bronchus centerline. In some embodiments, the merging technique may include determining the cosine values between the nodes which are not corresponding to the left upper lobe bronchus centerline or the left lower lobe bronchus centerline and the nodes corresponding to the left lung upper lobe bronchus centerline or the left lower lobe bronchus centerline. If the cosine values of the nodes corresponding to the left upper lobe bronchus centerline is smaller (e.g., smaller than a certain threshold), the nodes may be merged into the nodes corresponding to the left upper lobe bronchus centerline; otherwise the nodes may be merged to the nodes corresponding to the left lower lobe bronchus centerline. In the condition that the number of the child nodes is equal to 2, the z-coordinates of the normalized vectors may be determined, and the child node corresponding to a relatively large value of z-coordinate may be the node corresponding to the left upper lobe bronchus centerline and the child node corresponding to a relatively small value of the z-coordinate may be the node corresponding to the left lower lobe bronchus centerline. In 1049, the identified node corresponding to the left upper lobe bronchus centerline and the identified node corresponding to the left lower lobe bronchus centerline may be labeled (e.g., labeled as LU and LL, respectively).

In some embodiments, the searching for the nodes corresponding to the centerlines of the right upper lobe bronchus, the right middle lobe bronchus, and the right lower lobe bronchus may include identifying centerlines of the right upper lobe bronchus together with the right middle lobe bronchus, and identifying centerlines of the right middle lobe bronchus together with the right lower lobe bronchus. The operation of identifying the centerlines of the right upper lobe bronchus together with the right middle lobe bronchus, and identifying the centerlines of the right middle lobe bronchus together with the right lower lobe bronchus may be similar to the operation of identifying the centerlines of the left upper lobe bronchus and left lower lobe bronchus, respectively, and the descriptions thereof are not repeated herein.

Referring back to FIG. 10-A, in 1013, one or more identified centerlines in the airway tree may be labeled, or one or more branch airways corresponding to the centerline(s) may be labeled. In some embodiments, the identified airway centerline(s) may include the centerlines of the left upper lobe bronchus, the left lower lobe bronchus, the right upper lobe bronchus, the right lower lobe bronchus, and the right middle bronchus. The process of labeling may include classifying the airway corresponding to the identified airway centerline(s). In some embodiments, the process of labeling may be implemented by one or more operations below: classifying the nodes corresponding to the identified centerlines and the nodes corresponding to the centerlines which are not identified into a plurality of sorts (e.g., 10 sorts), and putting points of the centerline stored in the nodes into different vectors as seed points, and then performing a traversal. The classification may be performed based on the anatomical structure of a human body. The centerlines may be classified based on the anatomical structure of the left main bronchus, the right main bronchus, the left upper lobe bronchus, the left lower lobe bronchus, the right upper lobe bronchus, the right middle lobe bronchus, and the right lower lobe bronchus. The traversal may include processing each vector once, and the process may be referred to as one time-traversal. The traversal may include: taking multiple points as seed points, continuously designating neighboring points which satisfy a condition as new seed points, and then designating neighboring points which further satisfy the condition as the seed points. The above operation may be repeated until there is no new neighboring point satisfying the condition. In some embodiments, the traversal may include processing different vectors for many times. Each traversal may include one or more steps below: (1) selecting an unprocessed vector and performing a region growing for each point in the unprocessed vector. The region growing may include the following conditions: if the growing points are in the airway (including points on an airway wall) and are not yet processed, labeling these growing points with values of the nodes corresponding to the bronchus centerlines where the vector is located, and meanwhile storing these growing points into the vector to replace the original points in the vector; if all the points in the airway are processed, stopping performing region growing and exiting the step; (2) selecting vectors which are not traversed in this traversal and repeating step (1) until the traversal is completed; and (3) performing step (1) on points of each vector in the previous traversal. The points in each vector in the previous traversal may be the points in a neighboring region of the points subjected to region growing. Region growing may be further performed by regarding the points in the neighboring region as seed points. In some embodiments, after the nodes corresponding to the bronchus centerlines of the left upper lobe bronchus, the left lower lobe bronchus, the right upper lobe bronchus, the right middle lobe bronchus, and the right lower lobe bronchus, or the like, are obtained, descendant nodes thereof may be determined and labeled with different values (the different values cannot include values that have been labeled with).

The above description of the airway extraction process is only a specific example and should not be considered as the only possible embodiment. It will be apparent to those skilled in the art that, after understanding the basic principle, it is possible to make modifications and changes in the forms and details of the embodiments and operations without departing from the principle, but these modifications and changes are still within the scope of the above description. For example, one or more optional operations, such as, an iteration based on the centerlines of the airway tree, may be added between the operation 1005 and the operation 1007.

Figure 11:
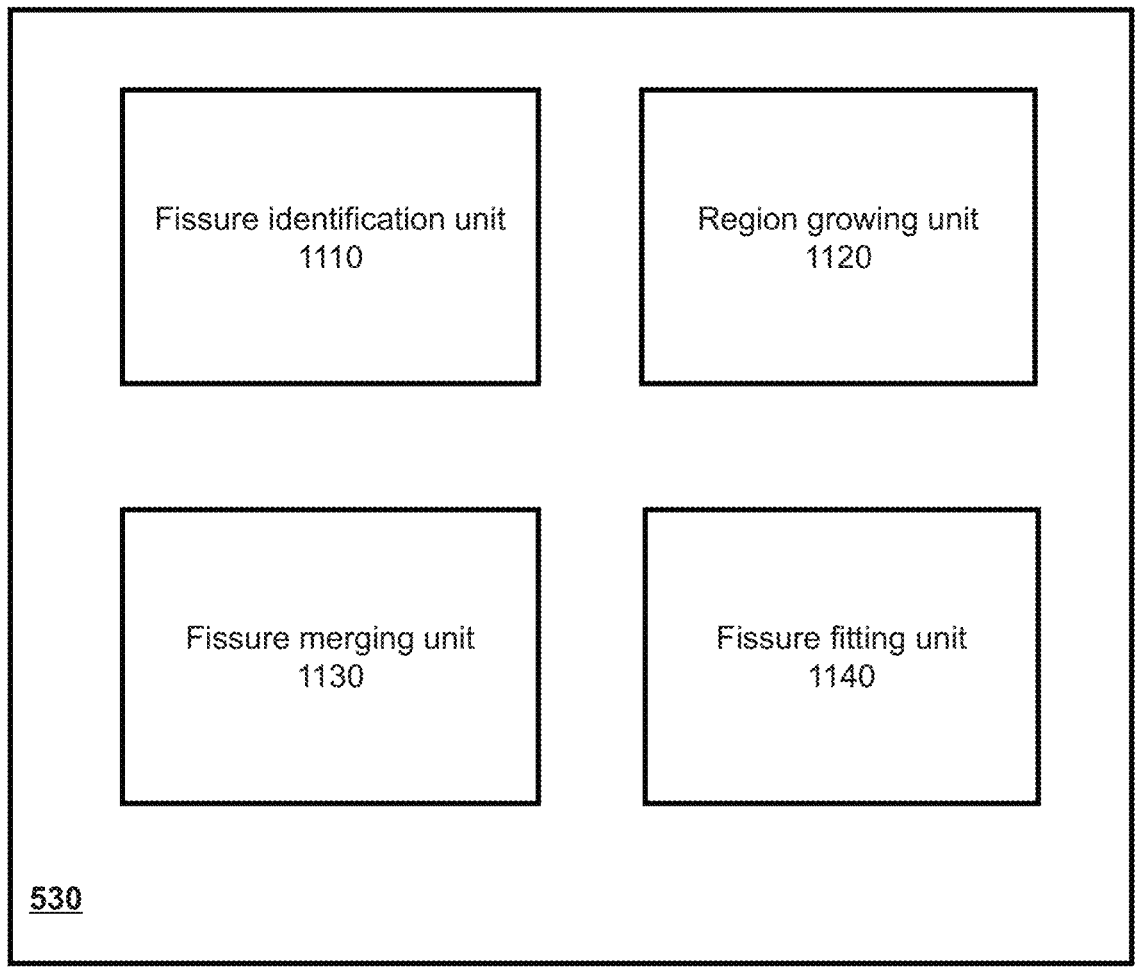
FIG. 11 is a schematic diagram illustrating a fissure segmentation module according to some embodiments of the present application.

FIG. 11 is a schematic diagram of the fissure segmentation module 530 according to some embodiments of the present application. As shown in FIG. 11, the fissure segmentation module 530 may include a fissure identification unit 1110, a region growing unit 1120, a fissure merging unit 1130, and a fissure fitting unit 1140.

The fissure identification unit 1110 may identify candidate fissures in the image slices. The candidate fissures may include the right oblique fissure, the right horizontal fissure, a left oblique fissure, or the like. In some embodiments, the candidate fissures may be obtained based on information of the lung image. The information of the lung image may include information such as a lung contour, an airway tree, an airway structure, a fissure, a pulmonary lobe and/or vascularity. For example, the fissure identification unit 1110 may identify the fissures in the lung image by performing an enhancement on the lung image. Detailed description about the fissure identification may be found elsewhere of the present application (e.g., FIG. 12 and the description thereof).

The region growing unit 1120 may perform region growing based on the candidate fissures. In some embodiments, the candidate fissures may be discrete. The neighboring point may have an Eigenvector that is similar to the Eigenvector of a pixel or voxel of the candidate fissure regions. The Eigenvectors described herein may be Eigenvectors of a matrix corresponding to the pixels or voxels, and specific description about the Eigenvectors may be found in FIG. 12. In some embodiments, the region growing may be implemented based on the Eigenvectors of the pixels of the candidate fissures. Detailed description about the region growing may be found elsewhere of the present application (e.g., FIG. 12 and the description thereof).

The fissure merging unit 1130 may merge the candidate fissure regions subjected to the region growing. The merging may be implemented based on an average Eigenvector of a candidate fissure region and the direction of the candidate fissure region. In some embodiments, the fissure merging unit 1130 may perform cluster analysis based on an average Eigenvector of a plurality of candidate fissure regions subjected to the region growing, and determine an average Eigenvector of candidate fissure regions belonging to the same sort. Further, the fissure merging unit 1130 may compare the candidate fissure regions belonging to the same sort, and merge regions having similar normal directions (e.g., an angle between the normal directions is smaller than a certain threshold). The candidate fissure can be considered to be planar, and the normal direction herein refers to a normal direction of the candidate fissure, i.e., a direction perpendicular to the candidate fissure. Detailed description about the fissure merging may be found elsewhere of the present application (e.g., FIG. 12 and the description thereof).

The fissure fitting unit 1140 may obtain a fissure curved surface. For example, the fissure fitting unit 1140 may fit the candidate fissure regions merged by the fissure merging unit 1130 to obtain one or more fissure curved surfaces. The fitting of the candidate fissure regions may be based on a fitting technique, such as, a thin plate spline interpolation.

It should be noted that the description of the fissure segmentation module 530 is merely provided for convenience of description, and the embodiments are not intended to limit the scope of the present application. It would be understood for those skilled in the art that after understanding the principle of the system, various modules may be combined, or the connection between a subsystem and the other modules may be constituted, without departing from this principle. For example, one or more modules can be integrated in one module implementing functions of the one or more modules.

Figure 12:
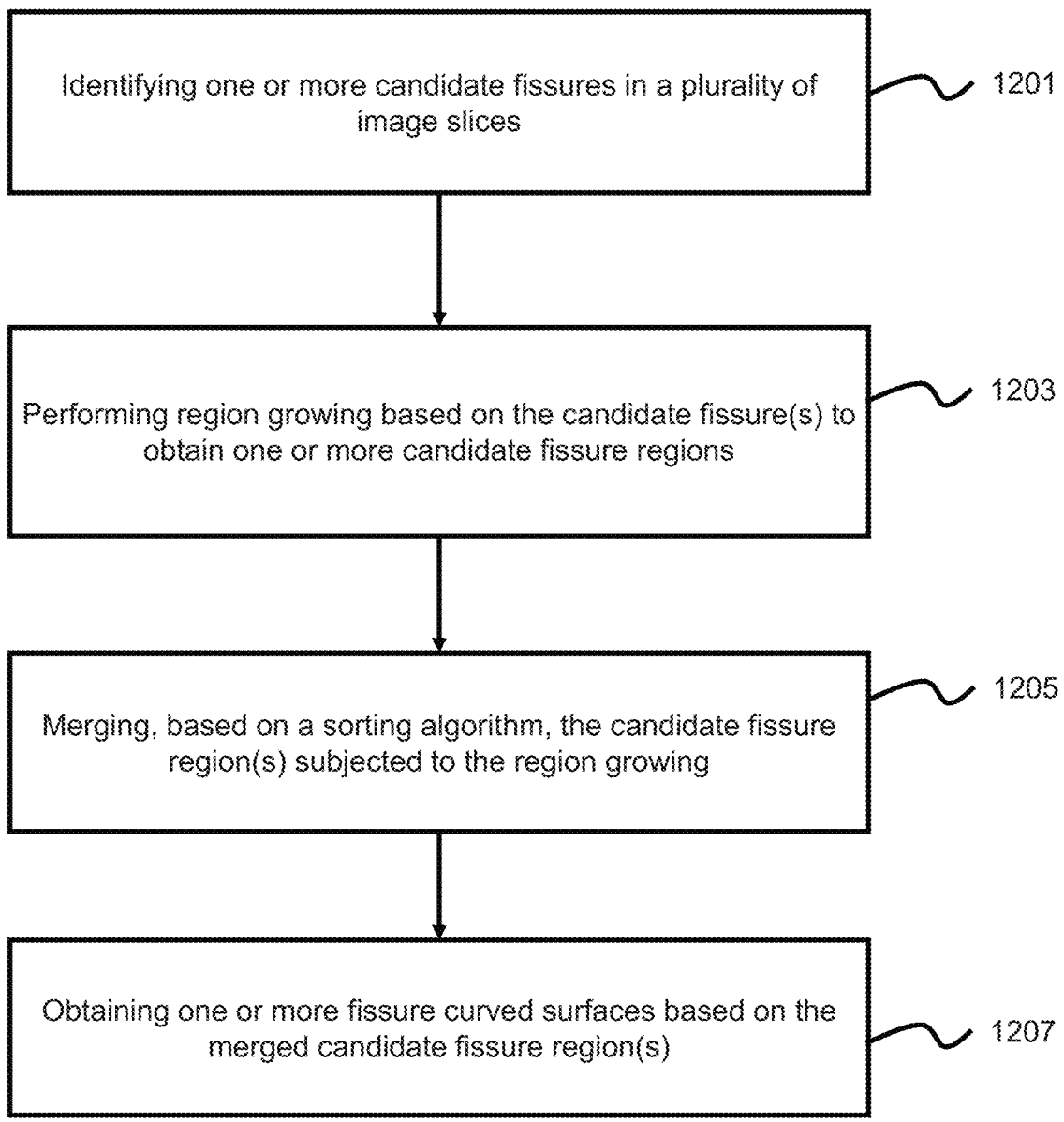
FIG. 12 is an exemplary flowchart illustrating a process of determining a fissure according to some embodiments of the present application.

FIG. 12 is an exemplary process of obtaining a fissure according to some embodiments of the present application. In 1201, one or more candidate fissures can be identified in a plurality of image slices. In some embodiments, the operation 1201 may be implemented by the candidate fissure identification unit 1110. In some embodiments, the candidate fissure(s) may be obtained according to the image slices of lung region. In some embodiments, the lung image may include information such as the lung contour, the airway tree, the airway structure, the fissure, the pulmonary lobe, and the vascularity. The fissure(s) may include the right oblique fissure, the right horizontal fissure, and a left oblique fissure. The left oblique fissure may segment the left lung into the left upper pulmonary lobe and the left lower pulmonary lobe. The right oblique fissure and the right horizontal fissure may segment the right lung into the right upper pulmonary lobe, the right middle pulmonary lobe, and the right lower pulmonary lobe. In some embodiments, the candidate fissure(s) may be obtained by an enhancement algorithm. For example, after enhancement is performed on the lung image, the part of the lung image having an enhancement value larger than a certain threshold may represent a candidate fissure. Furthermore, before performing the enhancement on the lung image, a vessel mask may be segmented by using greyscale information, so as to remove the vessel portion from the lung image. Alternatively, Gaussian smoothing may be performed on the lung image so as to shield the blood vessels and bright points in the lung image. For illustrative purpose, the enhancement may be performed based on a Hessian Matrix. Specifically, the Hessian Matrix and corresponding Eigenvalue Sfissure of a candidate point (e.g., the point in the lung region after parts of or all vessels are removed) in the lung image may be determined. According to the Eigenvalue Sfissure, a function to distinguish a fissure region and a non-fissure region may be used;

$$F\text{struct}=\exp(-\text{pow}(\text{abs}(f\text{EigenVal}[0])-m\text{alpha},6)/\text{pow}(m\text{beta},6)),$$

$$F\text{sheet}=\exp(-\text{pow}(f\text{EigenVal}[1],6)/\text{pow}(m\text{gamma},6)),$$

and $$S\text{fissure}=F\text{struct}\times F\text{sheet}, \tag{6}$$

where, alpha, beta, gamma, and theta are set by a user or a system. In some embodiments, the values of alpha, beta, gamma, and theta may be empirical values. fEigenVal is the Eigenvalue of the Hessian Matrix. According to Equation (6), a candidate fissure image cmask may be obtained by setting a range of Sfissure. For example, a point with its Sfissure larger than a threshold may be screened out to be the point of the candidate fissure.

In 1203, one or more candidate fissure regions may be obtained based on region growing of the candidate fissure(s). In some embodiments, the operation 1203 may be implemented by the region growing unit 1120. In some embodiments, the candidate fissure(s) may be discrete. The process of the region growing may include merging a neighboring point into the candidate fissure regions. The neighboring point may have an Eigenvector that is similar to the Eigenvector of a pixel or voxel of the candidate fissure regions. The neighboring points may be the points in a specific neighboring region of a pixel or voxel (e.g., within a distance of 3 pixels) of the candidate fissures. Eigenvectors that are similar may refer to that an angle between the Eigenvectors is smaller than a certain threshold. For example, the neighboring points of a fissure surface with Eigenvectors whose included angle is smaller than a certain threshold may be connected according to region growing. For example, the operation of region growing on the candidate fissure(s) may include one or more operations below: selecting a point A on the candidate fissures, and selecting an object point whose direction of Eigenvector is substantially the same as that of point A in the neighboring points of point A. For example, in the neighboring region of point A, if the dot product of the Eigenvector of point A and the Eigenvector of a specific point is larger than a certain threshold (e.g., 0.8), the specific point may be regarded as an object point; and keeping on selecting points near the object point and performing similar processes until points on the candidate fissure are traversed. It may be determined whether the number of the object points selected in the whole process is larger than a threshold M; if the number is larger than M, the selected points may be connected; if the number is equal to or smaller than M, the number of the selected points may be compared with a threshold N; if the number is larger than N, it may be further determined whether an average dot product of the selected points is larger than a threshold L. If the average dot product is larger than L, the selected points may be connected. In some embodiments, the threshold M, N, and L may be the selection conditions of region growing performed on the candidate fissures. M, N, and L may have arbitrary values set by a user.

In 1205, the candidate fissure regions subjected to the region growing may be merged based on a sorting algorithm. In some embodiments, the operation 1205 may be implemented by the fissure merging unit 1130. The merging may be implemented based on an average Eigenvector of a candidate fissure region and the direction of a candidate fissure. In some embodiments, the merging may include performing cluster analysis based on an average Eigenvector of a plurality of candidate fissure regions subjected to the region growing. The average Eigenvector of the plurality of candidate fissure regions may be an average value of the main Eigenvectors of the pixels in the plurality of candidate fissure regions. The main Eigenvector of the pixels may be an Eigenvector corresponding to a maximum Eigenvalue of pixels in the candidate fissures. The cluster analysis may cluster candidate fissure regions with similar average Eigenvectors into one cluster. Alternatively, the merging may further include removing a cluster in which the total number of pixels is smaller than a certain threshold, and determining an average Eigenvector of a cluster in which the number of pixels is larger than a certain threshold. The average Eigenvector of the cluster in which the number of pixels is larger than a certain threshold may be an average value of the main Eigenvectors of one or more region points belonging to the cluster. Alternatively, the candidate fissure regions of the same cluster obtained by clustering may further be compared. The comparison may include pairwise comparison on normal directions of the candidate fissure regions belonging to the same cluster, and merging candidate fissure regions with similar normal directions into one region. The normal direction may refer to the normal direction of the plane which represents the candidate fissure region. In some embodiments, if the difference between normal directions of two candidate fissure regions is relative small (e.g., an angle between the normal directions is smaller than a threshold), the two candidate fissure regions may be merged.

Merely by way of example, the performing merging on the candidate fissure regions subjected to the region growing may include one or more operations below: obtaining an average Eigenvector of each section in the candidate fissure regions subjected to the region growing; putting similar sections (e.g., two sections whose sum of the dot products of the average Eigenvectors is larger than a threshold of 0.9 may be regarded as similar sections) in a similarity queue; for each section, selecting the section and a section in the similarity queue and calculating the dot product of an average Eigenvector the two sections and a connecting line of gravity points of the two sections. The dot product result may be used to determine whether the two fissure sections are in the same fissure plane; and if the dot product result is smaller than a threshold (e.g., the threshold may be set to 0.5), the two sections may be merged (e.g., the two sections may be labeled with a same value). In some embodiments, the threshold of the dot product result may be adjusted (e.g., increasing the threshold step by step) until the number of sections that right lung is segmented to is less than four, and/or the number of sections that the left lung is segmented to is less than three. In some embodiments, region growing and merging may be performed on candidate fissures subjected to different Gaussian smoothing (e.g., selecting different smoothing coefficients) and superposing may be performed on fissure results generated after a plurality of times of merging.

In 1207, one or more fissure curved surfaces may be obtained based on the merged candidate fissure regions. In some embodiments, the operation 1207 may be implemented by the fissure fitting unit 1140. In some embodiments, the fitting may be performed based on the merged candidate fissure regions. The fitting technique may include thin plate spline interpolation. In some embodiments, the thin plate spline interpolation may be performed on the left lung for one time, and performed on the right lung for two times. In some embodiments, the fissure curved surfaces obtained by the thin plate spline interpolation may be retained inside the lung images for subsequent processing.

The above description of the fissure obtaining process is only a specific example and should not be considered as the only possible embodiment. It will be apparent to those skilled in the art that, after understanding the basic principle, it is possible to make modifications and changes in the forms and details of the embodiments and operations without departing from the principle, but these modifications and changes are still within the scope of the above description. For example, one or more optional operations, such as Hessian enhancement performed on the fissure, or the like, may be added between operation 1201 and operation 1203.

Figure 13:
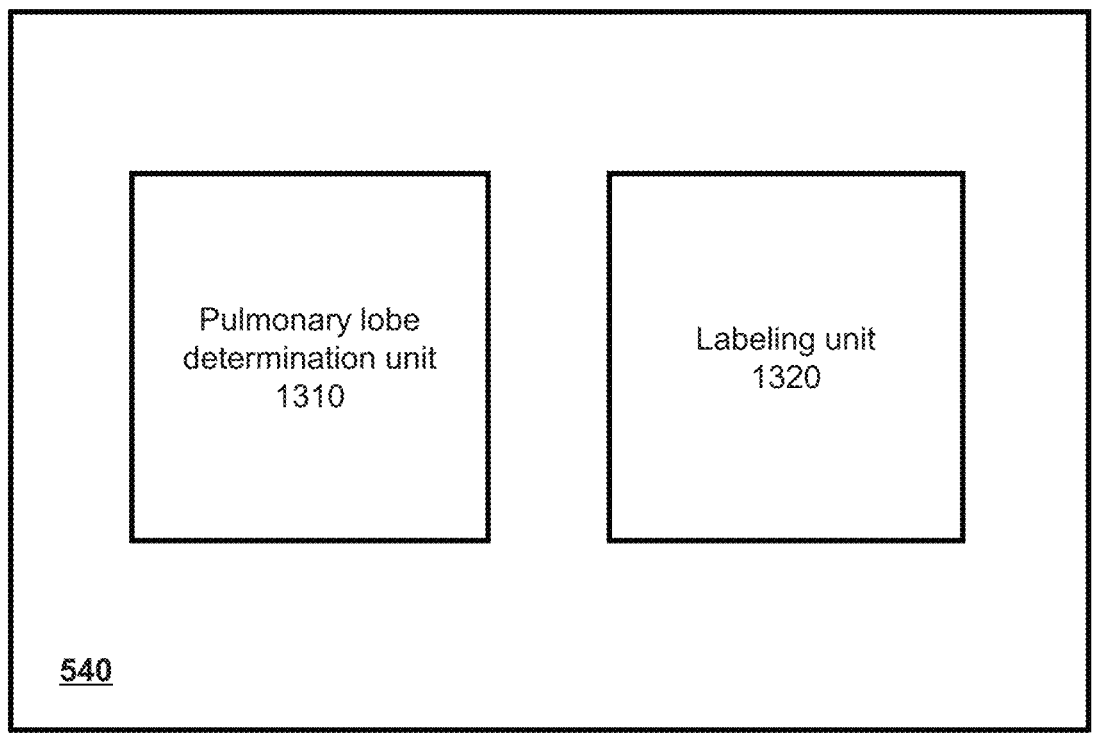
FIG. 13 is a schematic diagram illustrating a pulmonary lobe segmentation module according to some embodiments of the present application.

FIG. 13 is a schematic diagram of the pulmonary lobe segmentation module 540 according to some embodiments of the present application. As shown in FIG. 13, the pulmonary lobe segmentation module 540 may include a pulmonary lobe determination unit 1310 and a labeling unit 1320.

The pulmonary lobe determination unit 1310 may obtain and determine a shortest distance from a lung point to an airway branch, and a pulmonary lobe to which the lung point belongs. The airway branch may include the left main bronchus, the right main bronchus, the left upper lobe bronchus, or the like. The shortest distance from the lung point to the airway branch may be determined based on a distance algorithm. The distance algorithm may include, but not limited to a Dijkstra algorithm and a Floyd algorithm. The pulmonary lobe to which the lung point belongs may also be determined based on the shortest distance from the lung point to the airway branch. The pulmonary lobe may include the left upper lobe, the left lower lobe, the right upper lobe, the right middle lobe, the right lower lobe, or the like. Detailed description about the shortest distance from the lung point to the airway branch, and the pulmonary lobe to which the lung point belongs may be found elsewhere of the present application (e.g.; FIGS. 14-A, 14-B and the descriptions thereof).

The labeling unit 1320 may add a label for a point in a lung region. The label may be a color label, a value label, a letter label, a graph label; a sound label, or the like, or any combination thereof. The type and content of the label may be set by a user (e.g., a doctor), or may be decided by other components in the imaging system 100. For example, the labeling unit 1320 may add a color label for a pulmonary lobe. The color may be black, grey, white, blue, or the like, or a combination thereof. Colors of different pulmonary lobes may be same or different. As another example, the labeling unit 1320 may add a color label for a fissure based on the color label of the pulmonary lobe. Detailed description about adding a label for the pulmonary lobe and the fissure may be found elsewhere of the present application (e.g., FIGS. 14-A, 14-B and the descriptions thereof).

It should be noted that the description of the pulmonary lobe segmentation module 540 is merely provided for convenience of description, and the embodiments are not intended to limit the scope of the present application. It would be understood for those skilled in the art that after understanding the principle of the system, various modules may be combined, or the connection between a subsystem and the other modules may be constituted, without departing from this principle. For example, one or more modules can be integrated in one module implementing functions of the one or more modules.

FIG. 14-A is an exemplary process of obtaining a pulmonary lobe according to some embodiments of the present application. In 1401, a plurality of images relating to a lung region may be obtained. The images may include an airway structure and a fissure. In some embodiments, the images may include information of the vessels in the lung. The information of the vessels may be obtained according to techniques of vessel segmentation, threshold segmentation, or the like. In some embodiments, the airway may be identified according to, such as, the process 1000, and may further be labeled.

In 1403, a shortest distance from a point to an airway branch may be determined. In some embodiments, the operation 1403 may be implemented by the pulmonary lobe determination unit 1310. The airway branch may include the left main bronchus, the right main bronchus, the left upper lobe bronchus, the left lower lobe bronchus, the right upper lobe bronchus, the right middle lobe bronchus, and/or the right lower lobe bronchus. In some embodiments, the airway branch may be identified by the process 1000. In some embodiments, the shortest distance may be determined by an algorithm. The algorithm may include a Dijkstra algorithm, a Floyd algorithm, or the like. For illustrative purpose, in the process of determining the shortest distance by the Dijkstra algorithm, one or more variants below may be used in the Dijkstra algorithm. The variants may include an airway1 branch point, a color label for a point, and an expanded fissure information, etc. In some embodiments, initialization of one or more variants in the Dijkstra algorithm may be included. The initialization process may include one or more operations below: (1) initializing weights of points in the Dijkstra algorithm (e.g., setting a weight value of a point on the airway to be 0, setting the weighting value of a point on the vessel to be 1, and setting the weighting value of a point on the lung to be 100); (2) putting airway branches of the left lung and the right lung into two arrays separately so as to facilitate function invocation to complete the Dijkstra algorithm; and (3) expanding the fissure and storing the information of the expanded fissure. In some embodiments, the expansion process may include performing a convolution on the fissure or a mask image marking the fissure with a template. For example, a template with a size of 3*3*3 may be generated (values of pixels in the template may be set to be 1), and the fissure may be expanded by performing a convolution on the fissure or a mask image marking the fissure with the template.

In 1405, a pulmonary lobe to which the lung point belongs may be determined based on the shortest distance. In some embodiments, the operation 1405 may be implemented by the pulmonary lobe determination unit 1310. The pulmonary lobe may include an upper lobe of left lung, the left lower lobe, the right upper lobe, the right middle lobe, the right lower lobe, or the like. In some embodiments, the determination of the pulmonary lobe may be performed by identifying points on the left lung and the right lung. For example, a Dijkstra algorithm may be used for the left lung and the right lung, respectively. The process of using the Dijkstra algorithmic for the right lung may be shown in FIG. 14-B. In 1411, information of airway points, vessel points, and other point particles on the lung may be obtained from the lung image. The lung image may include one or more airway branches. The airway points may include the point of the entire airway and bronchus tree that has been segmented. For example, three queues may be generated to store the airway points, the vessel points, and other point particles on the lung, respectively. In 1413, the points on one or more airway branches may be labeled. Taking the right lung as an example, the airway of the right lung may be put into a first queue. Points on three airway branches of the right lung may be set to have three different labels. In some embodiments, the label may be set to be any number, for example, 3, 4, and 5, of which 3 represents the airway branch of the right upper lobe, 4 represents the airway branch of the right middle lobe, and 5 represents the airway branch of the right lower lobe. In 1415, a point from which the distance to the one or more airway branches is the smallest may be obtained based on the points labeled on the one or more airway branches. For example, the first points in each of the three queues may be compared, and the point from which the distance to a airway branch is the smallest may be taken out of the queue and a label with a corresponding color may be added for the point, and the point may be further set to be a developed point. Herein, three queues are provided with points of different types. When developing a point, the point from which the distance to a airway branch is the smallest may be selected, and thus a ranking operation when one queue is used may be avoided. Three sorts of points with different weight values may be separately put into the three queues, and a smallest point may be always at the head of the queue after each calculation. In 1417, whether the point with the shortest distance belongs to a fissure may be determined, and thus labelled. For example, the shortest distance values of 26 neighboring points (marked as B) of the point in 1415 may be separately determined. The shortest distance values may be compared with the original shortest distance value; if a newly determined shortest distance value is smaller than the original shortest distance value and the point B is not a point on the fissure, the point B may be put into a queue of a corresponding sort, with a record of the shortest path from the airway to the point B; and if point B is a point on the fissure, no operation may be performed, meaning that growing development is stopped as a fissure appears, and thus different pulmonary lobes may be segmented. The three queues where the points are put may be determined based on the above operations, and if the three queues are not all empty, the above operations may be repeated. Similarly, the left lung airway may be processed so as to perform a Dijkstra algorithm operation on the left lung.

Referring back to FIG. 14-A, in 1407, one or more pulmonary lobes may be labeled. The label may include a color label, a value label, a letter label, a graph label, a sound label, or the like, or any combination thereof. In some embodiments, the operation 1407 may be implemented by the labeling unit 1320. For example, color labels may be added for the left upper lobe, the left lower lobe, the right upper lobe, the right middle lobe, and/or the right lower lobe, respectively. The color labels of different pulmonary lobes may be same or different.

In 1409, a label may be added for a point in the fissure region relating to the one or more pulmonary lobes. In some embodiments, the process of adding the label for the point in the fissure region may include one or more operations below: 1) searching a neighboring point having a label within a specific neighboring region of the point in the fissure region; and 2) adding the same label as the neighboring point for the point in the fissure region. For example, a neighboring point having a color label in a neighboring region near the point in the fissure region may be searched for, and a same color label as the neighboring point may be added for the point in the fissure region. The neighboring point having a color label in the neighboring region that is searched for may be obtained by using a template of a size 3×3×3. For example, the point in the fissure region may be regarded as the center point, and 26 points adjacent to the center point in space may be regarded as the neighboring points of the center point.

The above description of the pulmonary lobe segmentation process is only a specific example and should not be considered as the only possible embodiments. It shall be apparent for those skilled in the art to, after understanding the basic principle, make modifications and changes to the forms and details of the embodiments and operations without departing from the principle, but these modifications and changes are still within the scope of the above description. For example, one or more optional operations, such as, performing a calculation according to Dijkstra, or the like, may be added between operation 1403 and operation 1405.

FIG. 15 is a schematic diagram of a result of lung region segmentation according to some embodiments of the present application. As shown in FIG. 15, the grey region 1510 on the right side may be a segmented left lung, and the grey region 1530 on the left side may be a segmented right lung.

Figure 16:
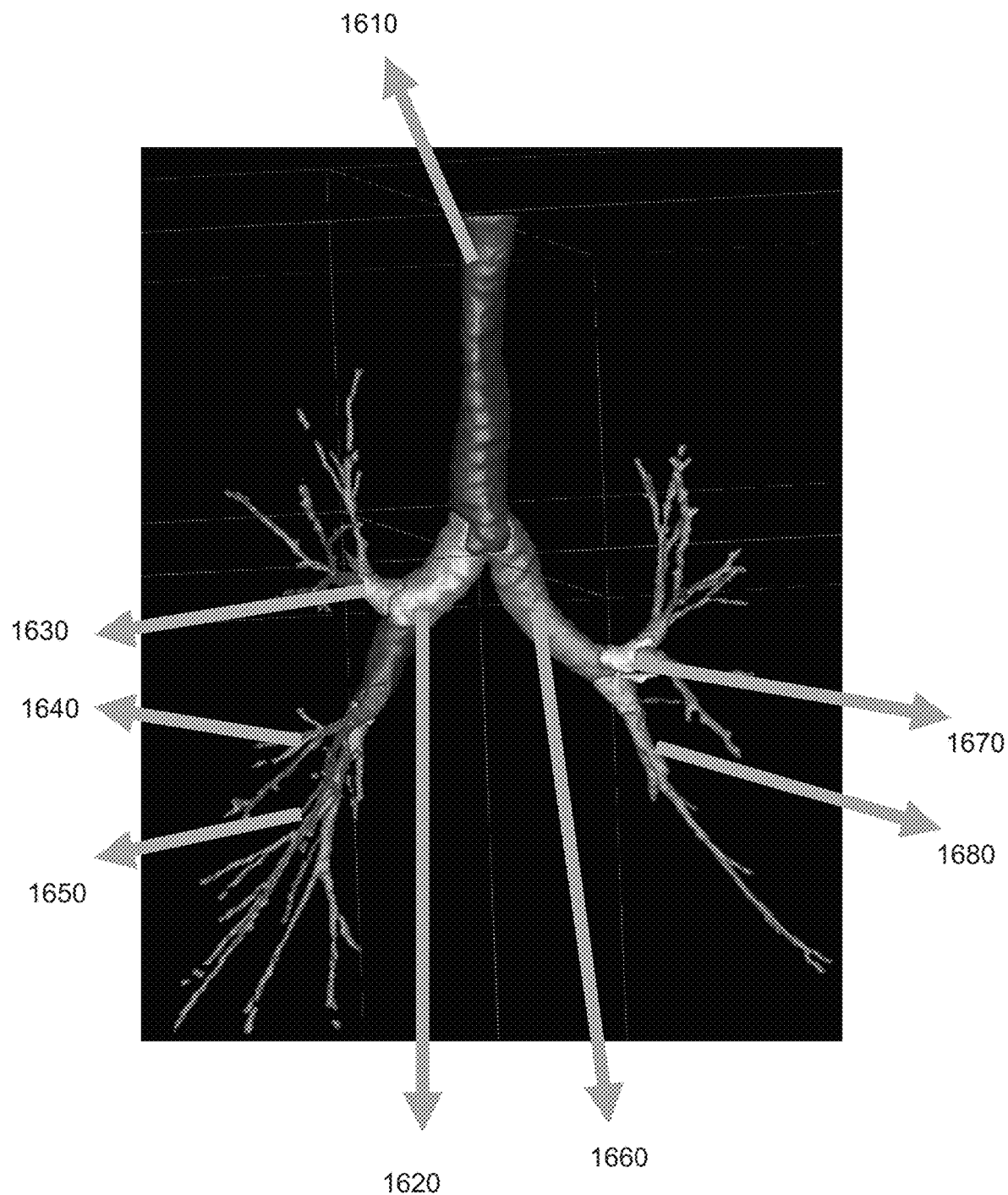
FIG. 16 is a schematic diagram illustrating a result of airway classification according to some embodiments of the present application.

According to some embodiments of the present application, FIG. 16 is a schematic diagram of a result of airway classification. As shown in FIG. 16, the airway structure may include the trachea 1610, the right main bronchus 1620, the right lung upper lobe bronchus 1630, the right middle lobe bronchus 1640, the right lower lobe bronchus 1650, the left main bronchus 1660, the left upper lobe bronchus 1670, the left lower lobe bronchus 1680, and other branch airways.

According to some embodiments of the present application, FIGS. 17-A to 17-C are schematic diagrams of a fissure segmentation result. FIG. 17-A shows an enhanced fissure. An upper figure of FIG. 17-B is a cross section image of the lung, and a lower figure is an enhanced fissure. An upper figure of FIG. 17-C is a cross section image of the lung, and a lower figure is a fissure image formed by fitting.

Figure 18:
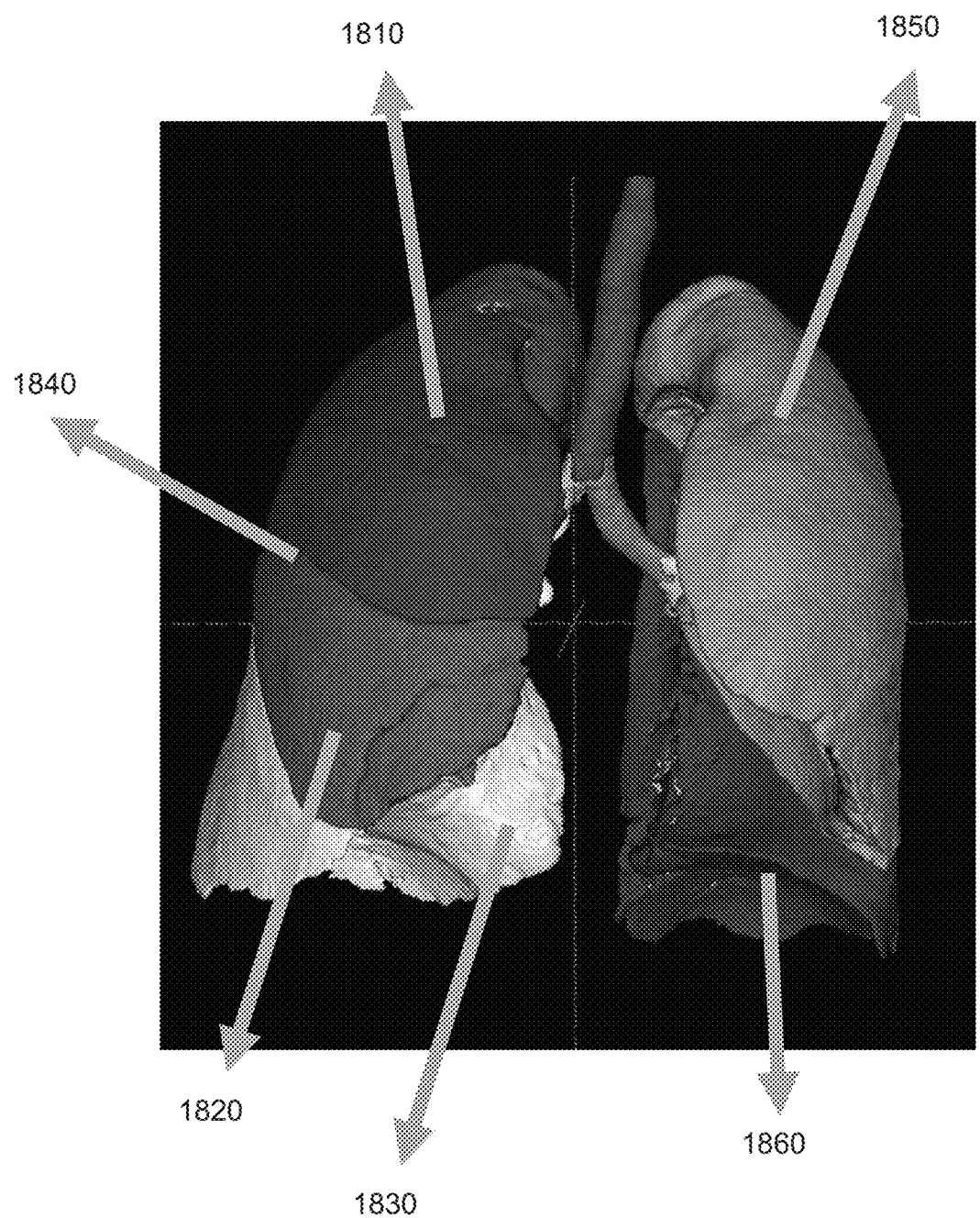
FIG. 18 is a schematic diagram illustrating a result of pulmonary lobe segmentation according to some embodiments of the present application.

According to some embodiments of the present application, FIG. 18 is a schematic diagram of a pulmonary lobe color labeling segmentation result. As shown in FIG. 18, the right lung upper lobe 1810, the right lung middle lobe 1820, the right lung lower lobe 1830, the left lung upper lobe 1850, and the left lung lower lobe 1860 contained in the lung may be separately labeled with different colors. A fissure gap 1840 may be contained between the right lung upper lobe 1810 and the right lung lower lobe 1830.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable medium having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially," For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one machine which has at least one processor and at least one storage device, the method comprising:
    obtaining a target image relating to a lung region, the target image including a plurality of image slices;
    segmenting the lung region from the target image;
    identifying an airway structure relating to the lung region;
    identifying one or more fissures in the lung region; and
    determining a distance from a point of the lung region to the airway structure; and
    determining, based on the distance, a pulmonary lobe to which the point of the lung region belongs, wherein the point of the lung region is located in an expansion region of the one or more fissures.

2. The method of claim 1, wherein the segmenting the lung region from the target image comprises:
    identifying a characteristic slice among the plurality of image slices;
    determining a starting slice and an end slice based on the characteristic slice;
    determining the lung region based on the starting slice and the end slice; and
    determining a left lung or a right lung in the lung region.

3. The method of claim 2, wherein the identifying a characteristic slice among the plurality of image slices comprises:
    determining a distribution of CT values of the plurality of image slices; and
    selecting, based on the distribution, the characteristic slice, wherein the CT values vary in a range.

4. The method of claim 1, wherein the identifying an airway structure relating to the lung region comprises:
    obtaining a reference point of the airway structure;
    generating, based on the reference point, an airway tree corresponding to the airway structure; and
    identifying one or more branches of the airway tree, wherein a branch of the one or more branches of the airway tree corresponds to a branch of the airway structure.

5. The method of claim 4, wherein the identifying one or more branches of the airway tree further comprises:
    identifying at least one node of the airway tree, the at least one node relating to a trachea, a left main bronchus, a right main bronchus, a left upper lobe bronchus, a left lower lobe bronchus, a right upper lobe bronchus or a right lower lobe bronchus.

6. The method of claim 1, wherein the identifying one or more fissures in the lung region comprises:
    identifying a plurality of candidate fissures in the lung region;
    sorting at least a part of the plurality of candidate fissures based on a sorting algorithm; and
    merging at least some of the sorted candidate fissures.

7. The method of claim 6, wherein the identifying a plurality of candidate fissures in the lung region comprises:
    determining a Hessian matrix corresponding to a voxel of the lung region;
    determining an Eigenvalue of the Hessian matrix; and
    designating, based on the Eigenvalue, that the voxel belongs to a candidate fissure of the plurality of candidate fissures.

8. The method of claim 6, wherein the merging at least some of the sorted candidate fissures comprises:
    determining a plurality of values, each of the plurality of values corresponding to one candidate fissure of the plurality of candidate fissures, wherein the plurality of values includes a plurality of normal directions corresponding to the plurality of candidate fissures;
    classifying, based on the plurality of values, the plurality of candidate fissures into at least two groups; and
    merging candidate fissures belonging to a same group.

9. The method of claim 6, wherein the identifying one or more fissures in the lung region further comprises fitting the merged candidate fissures to obtain the one or more fissures in the lung region.

10. The method of claim 1, wherein the distance is determined by a Dijkstra algorithm or a Floyd algorithm.

11. A system for image segmentation, comprising:
    at least one storage device storing a set of instructions; and
    at least one processor in communication with the at least one storage device, when executing the set of instructions, the at least one processor is directed to perform operations including:
        obtaining a target image relating to a lung region;
        segmenting the lung region from the target image;
        identifying an airway structure relating to the lung region;

identifying one or more fissures in the lung region; and determining a distance from a point of the lung region to the airway structure; and determining, based on the distance, a pulmonary lobe to which the point of the lung region belongs, wherein the point of the lung region is located in an expansion region of the one or more fissures.

12. The system of claim 11, wherein the target image includes a plurality of image slices, wherein the segmenting the lung region from the target image comprises:

identifying a characteristic slice among the plurality of image slices;

determining a starting slice and an end slice based on the characteristic slice;

determining the lung region based on the starting slice and the end slice; and determining a left lung or a right lung in the lung region.

13. The system of claim 12, wherein the identify a characteristic slice among the plurality of image slices comprises:

determining a distribution of CT values of the plurality of image slices; and selecting the characteristic slice based on the distribution, wherein the CT values vary in a certain range.

14. The system of claim 11, wherein the identifying an airway structure relating to the lung region comprises:

obtaining a reference point of the airway structure;

generating an airway tree corresponding to the airway structure based on the reference point; and identifying one or more branches of the airway tree, wherein a branch of the one or more branches of the airway tree corresponds to a branch of the airway structure.

15. The method of claim 14, wherein the identifying one or more branches of the airway tree further comprises:

identifying at least one node of the airway tree, the at least one node relating to a trachea, a left main bronchus, a right main bronchus, a left upper lobe bronchus, a left lower lobe bronchus, a right upper lobe bronchus or a right lower lobe bronchus.

16. The method of claim 11, wherein the identifying one or more fissures in the lung region comprises:

identifying a plurality of candidate fissures in the lung region;

sorting at least a part of the plurality of candidate fissures based on a sorting algorithm; and merging at least some of the sorted candidate fissures.

17. The system of claim 16, wherein the identifying a plurality of candidate fissures in the lung region comprises:

determining a Hessian matrix corresponding to a voxel of the lung region;

determining an Eigenvalue of the Hessian matrix; and designate that the voxel belongs to a candidate fissure of the plurality of candidate fissures based on the Eigenvalue.

18. The system of claim 16, wherein the merging at least some of the sorted candidate fissures comprises:

determining a plurality of values, each of the plurality of values corresponding to one candidate fissure of the plurality of candidate fissures, wherein the plurality of values includes a plurality of normal directions corresponding to the plurality of candidate fissures;

classifying, based on the plurality of values, the plurality of candidate fissures into at least two groups; and merging candidate fissures belonging to a same group.

19. The system of claim 16, wherein the identifying one or more fissures in the lung region comprises fitting the merged candidate fissures to obtain the one or more fissures in the lung region.

20. A non-transitory computer readable medium, storing instructions, the instructions when executed by a processor, causing the processor to execute operations comprising:

obtaining a target image relating to a lung region, the target image including a plurality of image slices;

segmenting the lung region from the target image;

identifying an airway structure relating to the lung region, comprising:

identifying one or more fissures in the lung region; and determining a distance from a point of the lung region to the airway structure; and determining, based on the distance, a pulmonary lobe to which the point of the lung region belongs, wherein the point of the lung region is located in an expansion region of the one or more fissures.

* * * * *